(12) United States Patent
Si et al.

(10) Patent No.: US 12,581,473 B2
(45) Date of Patent: Mar. 17, 2026

(54) METHOD AND APPARATUS FOR WIDEBAND OPERATION ON UNLICENSED SIDELINK

(71) Applicant: Samsung Electronics Co., Ltd., Suwon-si (KR)

(72) Inventors: Hongbo Si, Plano, TX (US); Emad Nader Farag, Flanders, NJ (US); Carmela Cozzo, San Diego, CA (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 18/345,943

(22) Filed: Jun. 30, 2023

(65) Prior Publication Data

US 2024/0023079 A1     Jan. 18, 2024

Related U.S. Application Data

(60) Provisional application No. 63/465,455, filed on May 10, 2023, provisional application No. 63/423,712, filed on Nov. 8, 2022, provisional application No. 63/423,146, filed on Nov. 7, 2022, provisional application No. 63/396,494, filed on Aug. 9, 2022,
(Continued)

(51) Int. Cl.
    *H04W 72/0457*     (2023.01)
    *H04W 72/0453*     (2023.01)
    *H04W 72/1263*     (2023.01)

(52) U.S. Cl.
    CPC ... *H04W 72/0457* (2023.01); *H04W 72/0453* (2013.01); *H04W 72/1263* (2013.01)

(58) Field of Classification Search
    CPC ......... H04W 72/0453; H04W 72/0457; H04W 72/1263
    See application file for complete search history.

(56) References Cited

U.S. PATENT DOCUMENTS

2022/0015072 A1    1/2022   Hwang et al.
2022/0312379 A1*   9/2022   Xue ................. H04W 28/0289
(Continued)

OTHER PUBLICATIONS

International Search Report and Written Opinion issued Oct. 17, 2023 regarding International Application No. PCT/KR2023/010005, 8 pages.
(Continued)

*Primary Examiner* — Brian P Cox

(57) ABSTRACT

Apparatuses and methods for wideband operation on an unlicensed sidelink (SL). A method performed by a user equipment (UE) includes determining a sidelink (SL) bandwidth part (BWP); determining a set of resource block sets (RB-sets) and a set of intra-cell guard bands between the set of RB-sets; and determining, based on the set of RB-sets, a resource pool. A lowest RB of the resource pool is aligned with a lowest RB of a first RB set, and a highest RB of the resource pool is aligned with a highest RB of a second RB set. The method further includes determining, based on the resource pool, a set of sub-channels, determining, based on the set of sub-channels, a transmission of a physical SL shared channel (PSSCH), performing a SL channel access procedure, and performing the transmission of the PSSCH after successfully performing the SL channel access procedure.

16 Claims, 18 Drawing Sheets

Related U.S. Application Data provisional application No. 63/390,558, filed on Jul. 19, 2022, provisional application No. 63/389,629, filed on Jul. 15, 2022.

(56) References Cited

U.S. PATENT DOCUMENTS

| | | | |
|---|---|---|---|
| 2024/0015716 A1* | 1/2024 | Cheng | H04L 27/0006 |
| 2024/0250781 A1* | 7/2024 | Liu | H04L 1/1822 |
| 2025/0203633 A1* | 6/2025 | Luque Sanchez | H04L 1/1861 |

OTHER PUBLICATIONS

OPPO, "Physical channel designs of NR sidelink in unlicensed channel", 3GPP TSG-RAN WG1 Meeting #109-e, R1-2203983, May 2022, 7 pages.

Qualcomm Incorporated, "Physical Channel Design for Sidelink on Unlicensed Spectrum", 3GPP TSG-RAN WG1 #109-e, R1-2205034, May 2022, 14 pages.

ZTE et al., "Discussion on physical layer structures and procedures for SL-U", 3GPP TSG RAN WG1 #109-e, R1-2203366, May 2022, 9 pages.

LG Electronics, "Discussion on physical channel design framework for sidelink on unlicensed spectrum", 3GPP TSG RAN WG1 Meeting #109-e, R1-2203714, May 2022, 7 pages.

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

* cited by examiner

601

Channel #3

Channel #2

Channel #1

Channel #0

Type 1 LBT         Channel Occupancy
(CO)

METHOD AND APPARATUS FOR WIDEBAND OPERATION ON UNLICENSED SIDELINK

CROSS-REFERENCE TO RELATED AND CLAIM OF PRIORITY

The present application claims priority under 35 U.S.C. § 119(e) to U.S. Provisional Patent Application No. 63/389,629 filed on Jul. 15, 2022; U.S. Provisional Patent Application No. 63/390,558 filed on Jul. 19, 2022; U.S. Provisional Patent Application No. 63/396,494 filed on Aug. 9, 2022; U.S. Provisional Patent Application No. 63/423,146 filed on Nov. 7, 2022; U.S. Provisional Patent Application No. 63/423,712 filed on Nov. 8, 2022; and U.S. Provisional Patent Application No. 63/465,455 filed on May 10, 2023, which are hereby incorporated by reference in their entirety.

TECHNICAL FIELD

The present disclosure relates generally to wireless communication systems and, more specifically, the present disclosure is related to apparatus and methods for wideband operation on an unlicensed sidelink (SL).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance. To meet the demand for wireless data traffic having increased since deployment of 4G communication systems, and to enable various vertical applications, 5G communication systems have been developed and are currently being deployed.

SUMMARY

The present disclosure relates to wideband operation on an unlicensed SL.

In one embodiment, a user equipment (UE) in a wireless communication system is provided. The UE includes a processor configured to determine a SL bandwidth part (BWP), determine a set of resource block sets (RB-sets) and a set of intra-cell guard bands between the set of RB-sets, and determine, based on the set of RB-sets, a resource pool. A lowest RB of the resource pool is aligned with a lowest RB of a first RB set, and a highest RB of the resource pool is aligned with a highest RB of a second RB set. The processor is further configured to determine, based on the resource pool, a set of sub-channels, determine, based on the set of sub-channels, a transmission of a physical SL shared channel (PSSCH), and perform a SL channel access procedure. The UE further includes a transceiver operably coupled to the processor, the transceiver configured to perform the transmission of the PSSCH after successfully performing the SL channel access procedure.

In another embodiment, a method performed by a UE in a wireless communication system is provided. The method includes determining a SL BWP, determining a set of RB-sets and a set of intra-cell guard bands between the set of RB-sets, and determining, based on the set of RB-sets, a resource pool. A lowest RB of the resource pool is aligned with a lowest RB of a first RB set, and a highest RB of the resource pool is aligned with a highest RB of a second RB set. The method further includes determining, based on the resource pool, a set of sub-channels, determining, based on the set of sub-channels, a transmission of a PSSCH, performing a SL channel access procedure, and performing the transmission of the PSSCH after successfully performing the SL channel access procedure.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
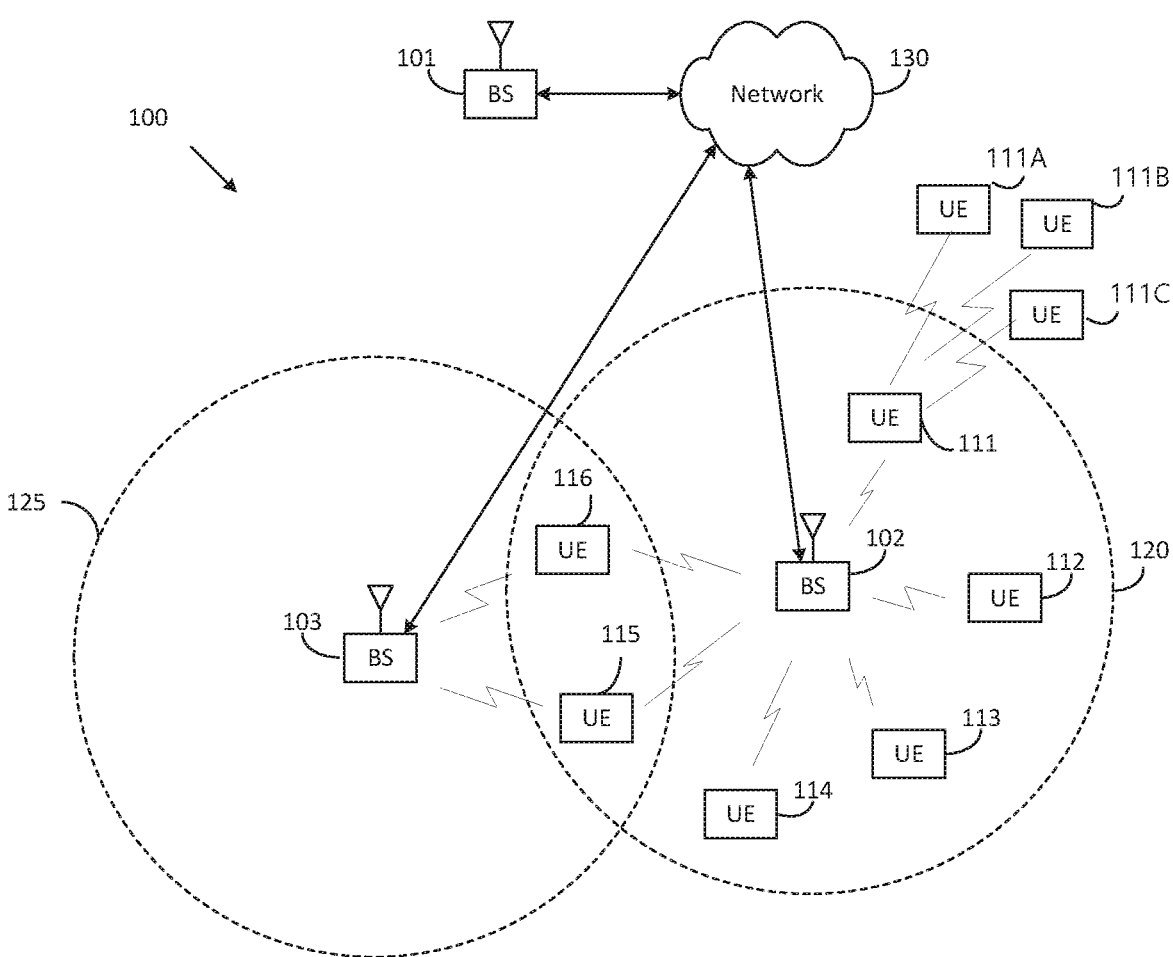
FIG. 1 illustrates an example wireless network according to embodiments of the present disclosure.

FIGS. 1-18, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents and standards descriptions are hereby incorporated by reference into the present disclosure as if fully set forth herein: [1] 3GPP TS 38.211 v16.1.0, "NR; Physical channels and modulation;" [2] 3GPP TS 38.212 v16.1.0, "NR; Multiplexing and Channel coding;" [3] 3GPP TS 38.213 v16.1.0, "NR; Physical Layer Procedures for Control;" [4] 3GPP TS 38.214 v16.1.0, "NR; Physical Layer Procedures for Data;" and [5] 3GPP TS 38.331 v16.1.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
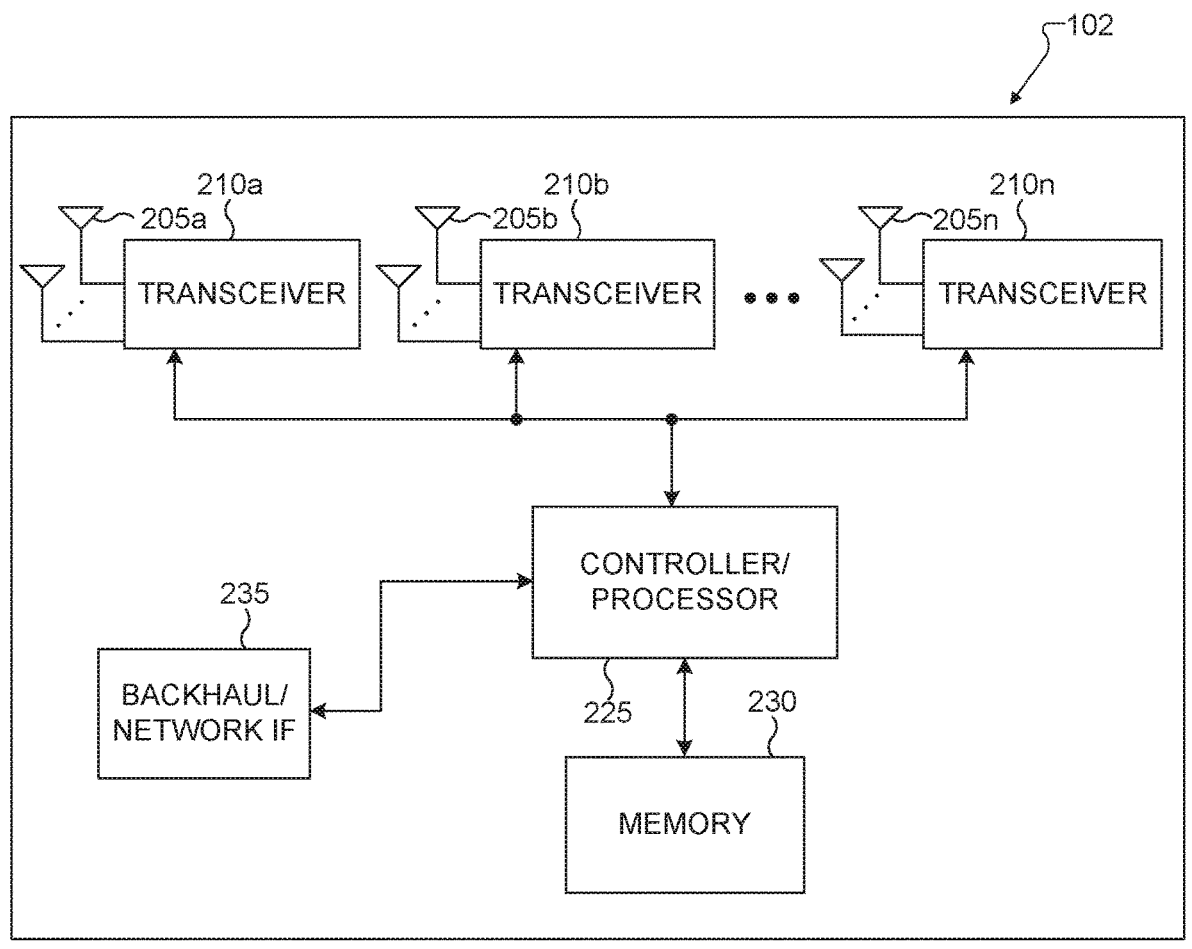
FIG. 2 illustrates an example gNodeB (gNB) according to embodiments of the present disclosure.
Figure 3:
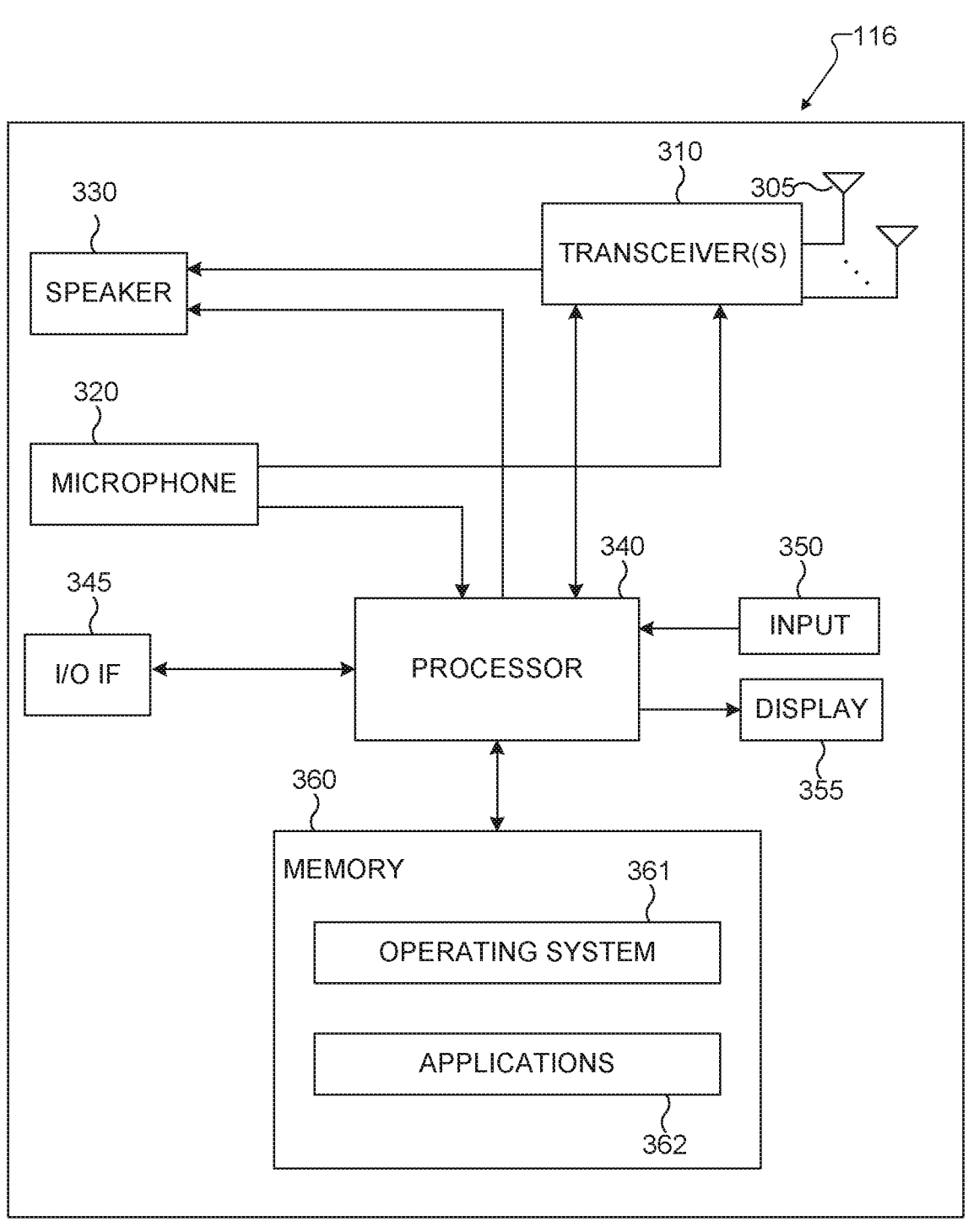
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, longterm evolution (LTE), longterm evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the LUE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for performing wideband operation on an unlicensed sidelink. In certain embodiments, one or more of the BSs 101-103 include circuitry, programing, or a combination thereof for supporting wideband operation on an unlicensed sidelink.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting wideband operation on an unlicensed sidelink. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the ULE 116. For example, the processor 340 could control the reception of DL and/or SL channels and/or signals and the transmission of UL and/or SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for supporting or utilizing wideband operation on an unlicensed SL as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
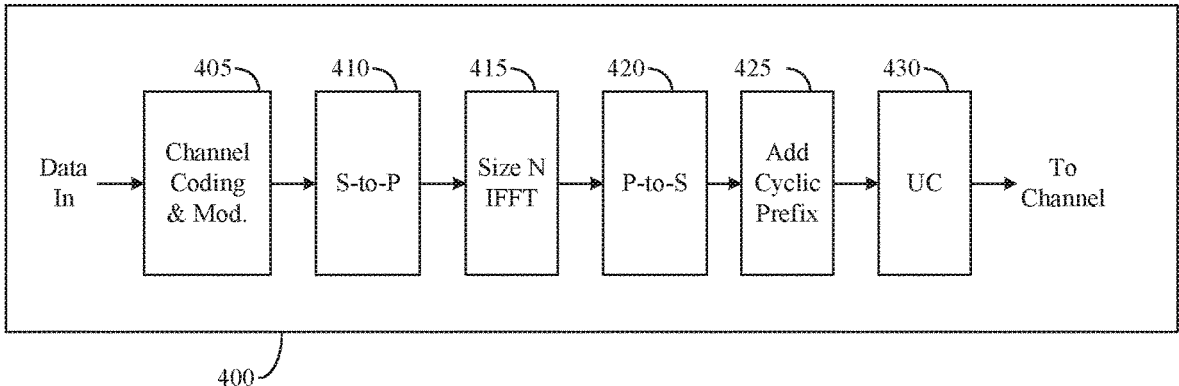
FIGS. 4A and 4B illustrates an example of a wireless transmit and receive paths according to embodiments of the present disclosure.
Figure 4B:
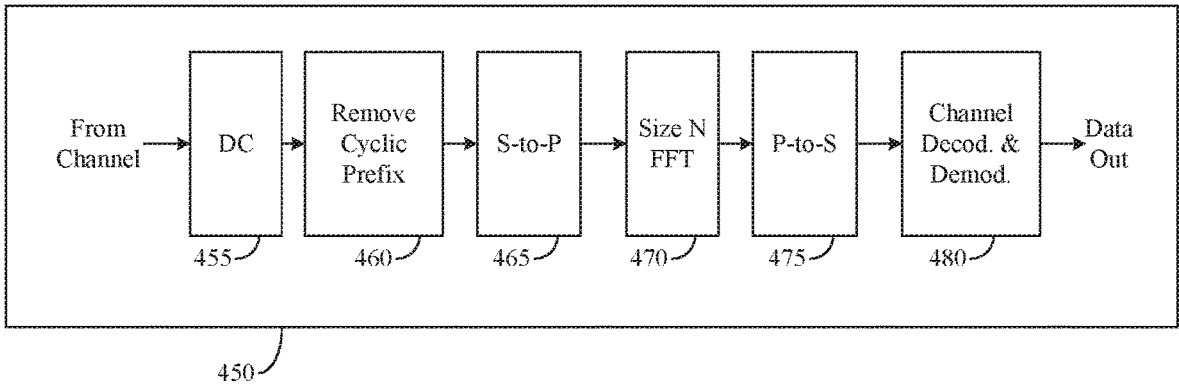

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. It may also be understood that the receive path 450 can be implemented in a first UE and that the transmit path 400 can be implemented in a second UE to support SL communications. In some embodiments, the receive path 450 is configured to support wideband operation on an unlicensed SL as described in embodiments of the present disclosure.

As illustrated in FIG. 4A, the transmit path 400 includes a channel coding and modulation block 205, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Embodiments of the present disclosure recognize, according to Rel-16 NR V2X, transmission and reception of sidelink (SL) signals and channels are based on resource pool(s) confined in the configured SL bandwidth part (BWP).

Figure 5:
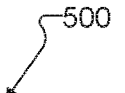
FIG. 5 illustrates an example of a resource pool according to embodiments of the present disclosure.
Figure 5:
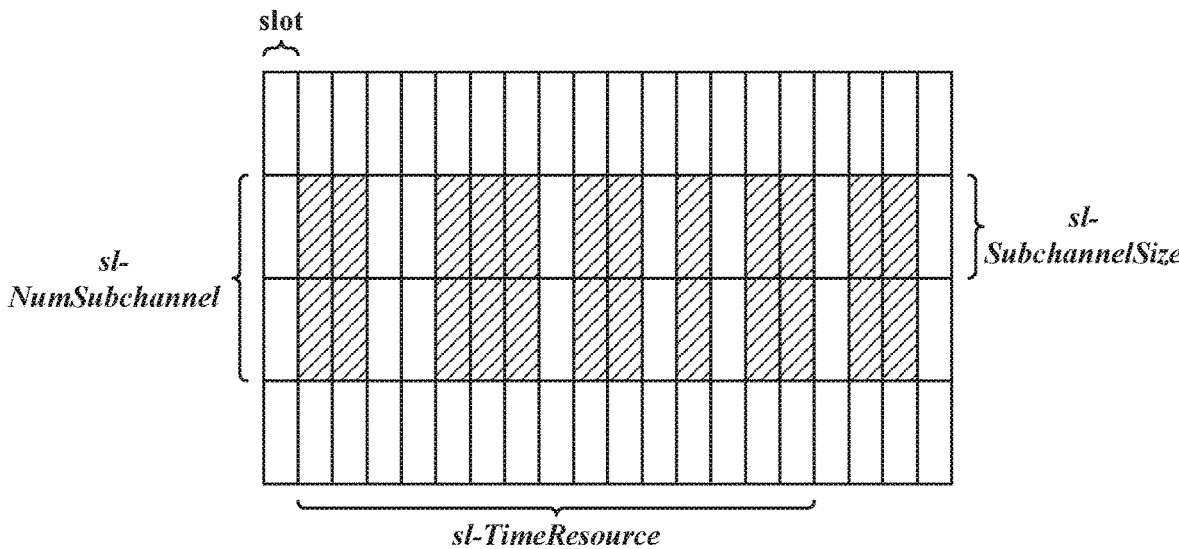

FIG. 5 illustrates an example architecture 500 for a resource pool according to embodiments of the present disclosure. For example, architecture 500 can be utilized by any of the UEs 111-116 to perform SL communications. This example is for illustration only and other embodiments can be used without departing from the scope of the present disclosure.

Referring to FIG. 5, in the frequency domain, a resource pool consists of a (pre-)configured number (e.g., sl-Num-Subchannel) of contiguous sub-channels with a starting location in the frequency domain (e.g., sl-StartRB-Subchannel), wherein each sub-channel comprises of a set of contiguous resource blocks (RBs) in a slot with size (pre-)configured by higher layer parameter (e.g., sl-SubchannelSize). In the time domain, slots in a resource pool occur with a periodicity of 10240 ms, and slots including S-SSB, non-UL slots, and reserved slots are not applicable for a resource pool. The set of slots for a resource pool is further determined within the remaining slots, based on a (pre-)configured bitmap (e.g., sl-TimeResource).

Transmission and reception of physical sidelink shared channel (PSSCH), physical sidelink control channel (PSCCH), and physical sidelink feedback channel (PSFCH) are confined within and associated with a resource pool, with parameters (pre-)configured by higher layers (e.g., SL-PSSCH-Config, SL-PSCCH-Config, and SL-PSFCH-Config, respectively).

A UE transmits the PSSCH in consecutive symbols within a slot of the resource pool, and PSSCH resource allocation starts from the second symbol configured for sidelink, e.g., startSLsymbol+1, and the first symbol configured for sidelink is duplicated from the second configured for sidelink, for automatic gain control (AGC) purposes. The UE 116 does not transmit PSSCH in symbols not configured for sidelink, in symbols configured for PSFCH, in the last symbol configured for sidelink, or in the symbol immediately preceding the PSFCH. The frequency domain resource allocation unit for PSSCH is the sub-channel, and the sub-channel assignment is determined using the corresponding field in the associated SCI.

Embodiments of the present disclosure recognize, according to Rel-16 NR-U, for operation with shared spectrum channel access (e.g., unlicensed or shared spectrum), a carrier wider than the granularity for performing channel access procedure (e.g., wideband operation) is supported, wherein a carrier can include one or multiple channels and channel access procedures are performed over the one or multiple channels. For this purpose, a concept of RB-set is introduced, and one RB-set consists of a contiguous number of RBs, and one BWP in the carrier consists of one or multiple RB-sets, with an intra-cell guard band between neighboring RB-sets.

Figure 6:
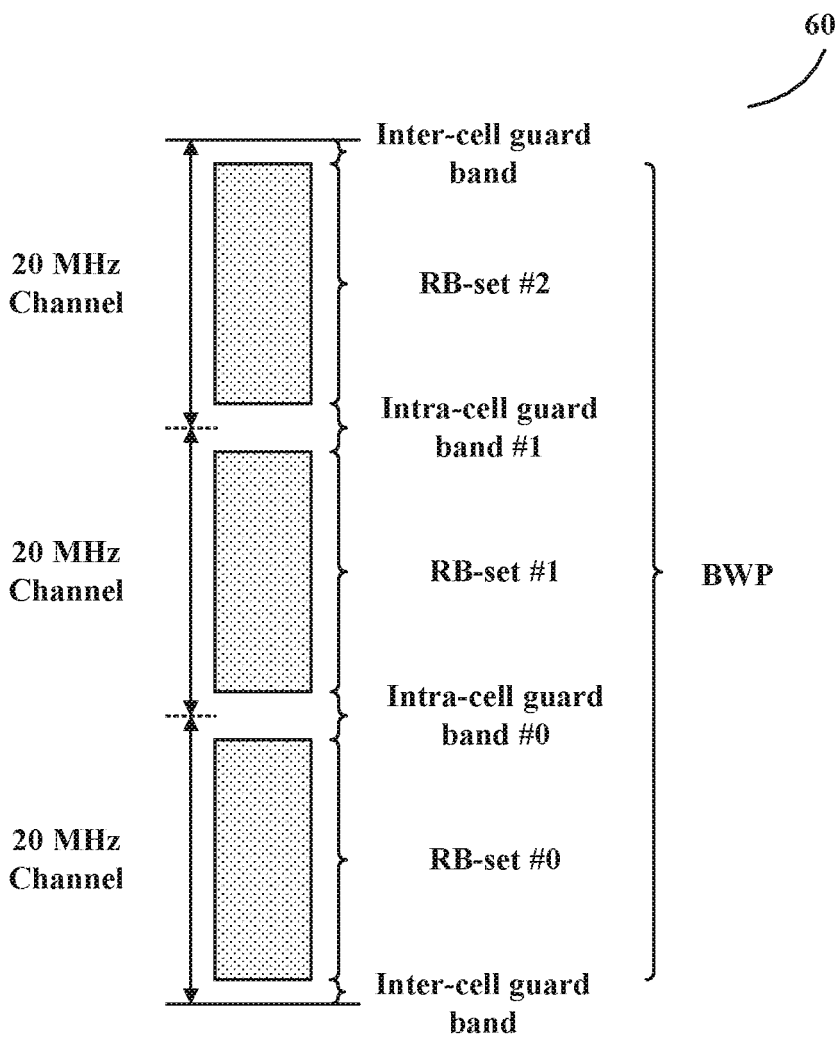
FIG. 6 illustrates an example of RB-sets within a wideband carrier according to embodiments of the present disclosure.

FIG. 6 illustrates an example architecture 600 for RB-sets within a wideband carrier according to embodiments of the present disclosure. For example, the architecture 600 may be utilized by any of the UEs 111-116 to perform SL communications. This example is for illustration only and other embodiments can be used without departing from the scope of the present disclosure.

For a SL operated over an unlicensed spectrum, wideband operation also needs to be supported, and the associated resource allocation based on the RB-sets should be designed.

Embodiments of the present disclosure focuses on wideband operation for SL unlicensed, wherein the carrier with a wideband can span multiple of LBT bandwidths (e.g., 20 MHz, or equivalently referred as channels wherein channel access procedures are performed before transmission). More precisely, the following aspects are included in this disclosure: SL BWP in wideband operation; SL resource pool in wideband operation which includes contiguous RB based SL resource pool and interlaced RB based SL resource pool; and S-SSB in wideband operation.

In one embodiment, a SL BWP can be determined based on a number of RB-sets.

In one example, for a SL carrier with a subcarrier spacing y, the $N_{RB-set,SL}$ number of RB-sets can be determined based on $N_{RB-set,SL}-1$ number of intra-cell guard bands, wherein each of the intra-cell guard band (e.g. with index $0 \leq s \leq N_{RB-set,SL}-2$) can be determined based on a starting common RBs (CRBs) (e.g. denoted by $GB_{s,SL}^{start,\mu}$) and a size in number of CRBs (e.g. denoted by $GB_{s,SL}^{size,\mu}$).

In this example, each RB-set (e.g., with index $0 \leq s \leq N_{RB-set,SL}-1$) has starting CRB (e.g., denoted as $RB_{s,SL}^{start,\mu}$) and ending CRB (e.g., denoted as $RB_{s,SL}^{end,\mu}$) given by $$RB_{s,SL}^{start,\mu}=N_{grid,SL}^{start,\mu} \text{ for } s=0,$$

$$RB_{s,SL}^{start,\mu}=N_{grid,SL}^{start,\mu}+GB_{s-1,SL}^{start,\mu}+GB_{s-1,SL}^{size,\mu} \text{ for } 1 \leq s \leq NR_{RB-set,SL}-1$$

$$RB_{s,SL}^{end,\mu}=N_{grid,SL}^{start,\mu}+N_{grid,SL}^{size,\mu}-1 \text{ for } s=N_{RB-set,SL}-1, \text{ and}$$

$$RB_{s,SL}^{end,\mu}=N_{grid,SL}^{start,\mu}+GB_{s,SL}^{start,\mu}-1 \text{ for } 0 \leq s \leq N_{RB-set,SL}-2,$$

wherein $N_{grid,SL}^{start,\mu}$ is the starting CRB of the carrier, and $N_{grid,SL}^{start,\mu}$ is the size of the carrier in number of CRBs.

In this example, the size of each RB-set (e.g., with index $0 \leq s \leq N_{RB-set,SL}-1$) can be given by $RB_{s,SL}^{size,\mu}=RB_{s,SL}^{end,\mu}-RB_{s,SL}^{start,\mu}+1$.

In another example, the starting CRB and/or the size in number of CRBs can be configured by a higher layer parameter provided by the gNB 102 (e.g., Uu link RRC parameter).

In yet another example, the starting CRB and/or the size in number of CRBs can be configured by a higher layer parameter provided by the UE 116 (e.g., PC5 RRC parameter).

In yet another example, the starting CRB and/or the size in number of CRBs can be provided by a pre-configuration.

In yet another example, when the starting CRB and/or the size in number of CRBs are not provided, the UE 116 can determine the starting CRB and/or the size in number of CRBs according to a default pattern.

In yet another example, the boundaries of the SL BWP are aligned with the boundaries of RB-sets included in the SL BWP, e.g., such that the lowest RB of the SL BWP is aligned with a lowest RB of a first RB set, and the highest RB of the SL BWP is aligned with a highest RB of a second RB set (e.g., the first and second RB set may or may not be the same). For instance, the UE 116 expects the SL BWP in the carrier satisfies $$N_{BWP,i}^{start,\mu}=RB_{s0,SL}^{start,\mu}, N_{BWP,i}^{end,\mu}=RB_{s1,SL}^{end,\mu},$$
$$\text{and } N_{BWP,i}^{size,\mu}=RB_{s1,SL}^{end,\mu}-RB_{s0,SL}^{start,\mu}+1,$$

where $0 \leq s0 \leq s1 \leq N_{RB-set,SL}-1$.

In yet another example, the SL BWP includes a number of RB-sets and the intra-cell guard bands in between, e.g., such that the lowest RB of the SL BWP is no higher than a lowest RB of a RB set, and the highest RB of the SL BWP is no lower than a highest RB of a RB set. For instance, the UE 116 expects the SL BWP in the carrier satisfies $$N_{BWP,i}^{start,\mu} \leq RB_{s0,SL}^{start,\mu}, N_{BWP,i}^{end,\mu} \geq RB_{s1,SL}^{end,\mu},$$
$$\text{and } N_{BWP,i}^{size,\mu} \geq RB_{s1,SL}^{end,\mu}-RB_{s0,SL}^{start,\mu}+1,$$

where $0 \leq s0 \leq s1 \leq N_{RB-set,SL}-1$.

In yet another example, the SL BWP is confined within a number of RB-sets and the intra-cell guard bands in between, e.g., such that the lowest RB of the SL BWP is no lower than a lowest RB of a RB set, and the highest RB of the SL BWP is no higher than a highest RB of a RB set. For instance, the LIE 116 expects the SL BWP in the carrier satisfies $$N_{BWP,i}^{start,\mu} \geq RB_{s0,SL}^{start,\mu}, N_{BWP,i}^{end,\mu} \leq RB_{s1,SL}^{end,\mu},$$
$$\text{and } N_{BWP,i}^{size,\mu} \leq RB_{s1,SL}^{end,\mu}-RB_{s0,SL}^{start,\mu}+1,$$

where $0 \leq s0 \leq s1 \leq N_{RB-set,SL}-1$.

In yet another example, there is single SL BWP in the carrier, and s0=0, s1=$N_{RB-set,SL}$−1.

In yet another example, the LIE 116 expects the SL RB-sets are the same as at least one of the UL RB-sets or DL RB-sets.

In yet another example, the LIE 116 expects the SL RB-sets to not overlap with at least one of the UL RB-sets or DL RB-sets.

In one embodiment, for a contiguous RB based resource pool, the resource pool can be determined based on the RB-sets. In the examples of this embodiment, $N_{RP}^{start,\mu}$ or $N_{RP,i}^{start,\mu}$ refers to the starting RB of the resource pool (e.g. with index i) $N_{RP}^{end,\mu}$ or $N_{RP,i}^{size,\mu}$ refers to the ending RB of the resource pool (e.g. with index i), and $N_{RP}^{size,\mu}$ or $N_{RP,i}^{size,\mu}$ refers to the size of the resource pool in the unit of RBs (e.g. with index i), for a SCS given by μ.

Figure 7:
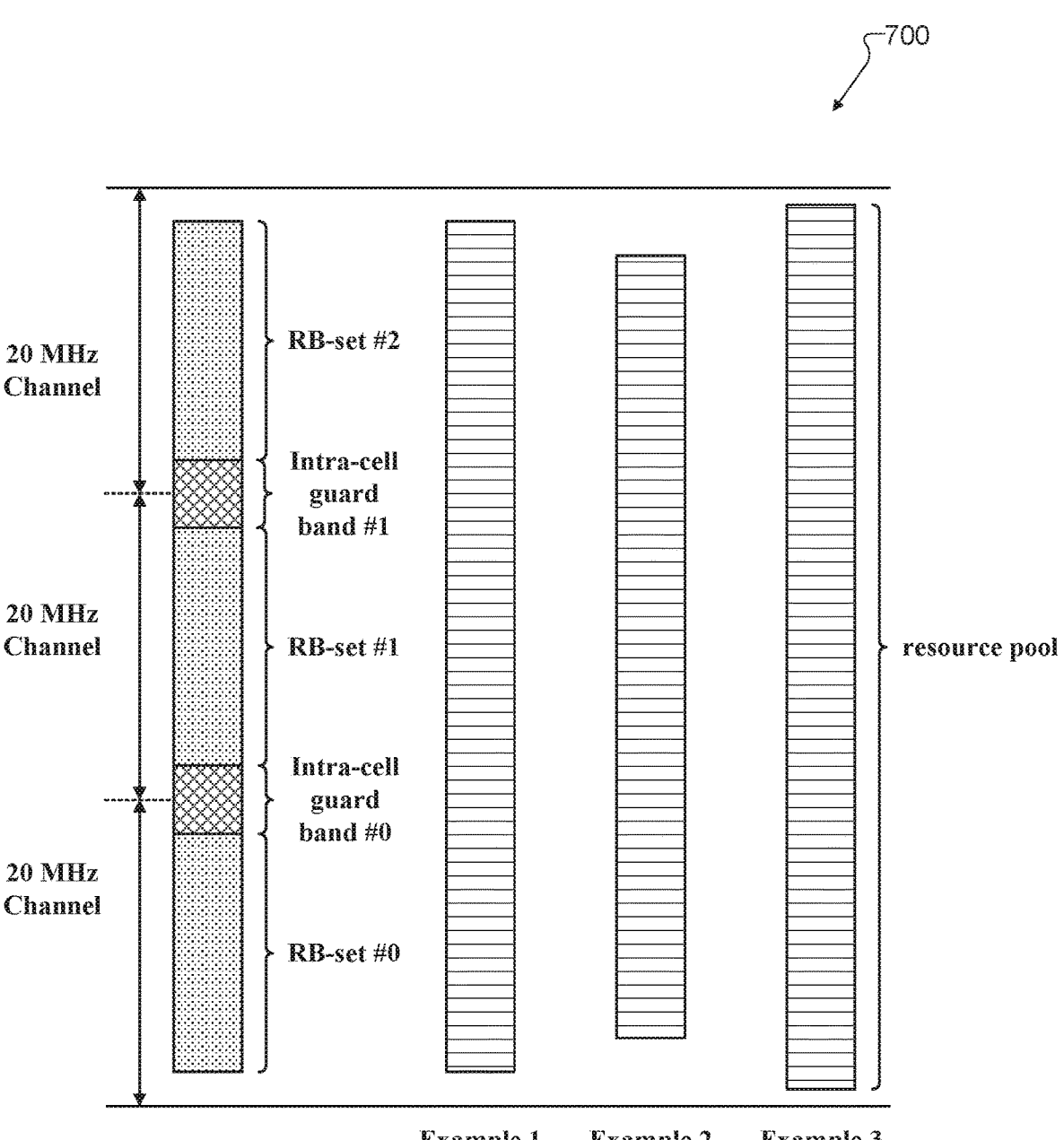
FIG. 7 illustrates an example of a resource pool based on RB-sets according to embodiments of the present disclosure.

FIG. 7 illustrates an example architecture 700 for a resource pool based on RB-sets according to embodiments of the present disclosure. For example, architecture 700 may be utilized by any of the UEs 111-116 to perform SL communications. This example is for illustration only and other embodiments can be used without departing from the scope of the present disclosure.

In one example (an illustration shown in Example 1 of FIG. 7), there is a single resource pool in the SL BWP, and the boundaries of the single resource pool can be aligned with the boundaries of RB-sets included in the SL BWP, e.g., such that the lowest RB of the resource pool is aligned with a lowest RB of a RB set, and the highest RB of the resource pool is aligned with a highest RB of a RB set. For instance, the UE 116 expects the resource pool in the BWP satisfies $$N_{RP}^{start,\mu}=RB_{s0,SL}^{start,\mu}, N_{RP}^{end,\mu}=RB_{s1,SL}^{end,\mu}, \text{ and}$$
$$N_{RP}^{size,\mu}=RB_{s1,SL}^{end,\mu}-RB_{s0,SL}^{start,\mu}+1,$$

where 0≤s0≤s1≤$N_{RB-set,SL}$−1, e.g., the RB-set with index s0 corresponds to the lowest RB-set in the SL BWP and the RB-set with index s1 corresponds to the highest RB-set in the SL BWP. For another instance, the single resource pool can be the same as the BWP in the frequency domain. For yet another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

In another example (an illustration shown in Example 1 of FIG. 7), there is a single resource pool in the SL BWP, and the single resource pool can be confined within a number of RB-sets included in the SL BWP, e.g., such that the lowest RB of the resource pool is no lower than a lowest RB of a RB set, and the highest RB of the resource pool is no higher than a highest RB of a RB set. For instance, the UE 116 expects the resource pool in the BWP satisfies $$N_{RP}^{start,\mu}\geq RB_{s0,SL}^{start,\mu}, N_{RP}^{end,\mu}\leq RB_{s1,SL}^{end,\mu}, \text{ and}$$
$$N_{RP}^{size,\mu}\geq RB_{s1,SL}^{end,\mu}-RB_{s0,SL}^{start,\mu}+1,$$

where 0≤s0≤s1≤$N_{RB-set,SL}$−1, e.g., the RB-set with index s0 corresponds to the lowest RB-set in the SL BWP and the RB-set with index s1 corresponds to the highest RB-set in the SL BWP. For another instance, the single resource pool can be the same as the BWP in the frequency domain. For yet another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

In yet another example (an illustration shown in Example 3 of FIG. 7), there is a single resource pool in the SL BWP, and the single resource pool can include a number of RB-sets included in the SL BWP, e.g., such that the lowest RB of the resource pool is no higher than a lowest RB of a RB set, and the highest RB of the resource pool is no lower than a highest RB of a RB set. For instance, the UE 116 expects the resource pool in the BWP satisfies $$N_{RP}^{start,\mu}\leq RB_{s0,SL}^{start,\mu}, N_{RP}^{end,\mu}\geq RB_{s1,SL}^{end,\mu}, \text{ and}$$
$$N_{RP}^{size,\mu}\leq RB_{s1,SL}^{end,\mu}-RB_{s0,SL}^{start,\mu}+1,$$

where 0≤s0≤s1≤$N_{RB-set,SL}$−1, e.g., the RB-set with index s0 corresponds to the lowest RB-set in the SL BWP and the RB-set with index s1 corresponds to the highest RB-set in the SL BWP. For another instance, the single resource pool can be the same as the BWP in the frequency domain. For yet another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

Figure 8:
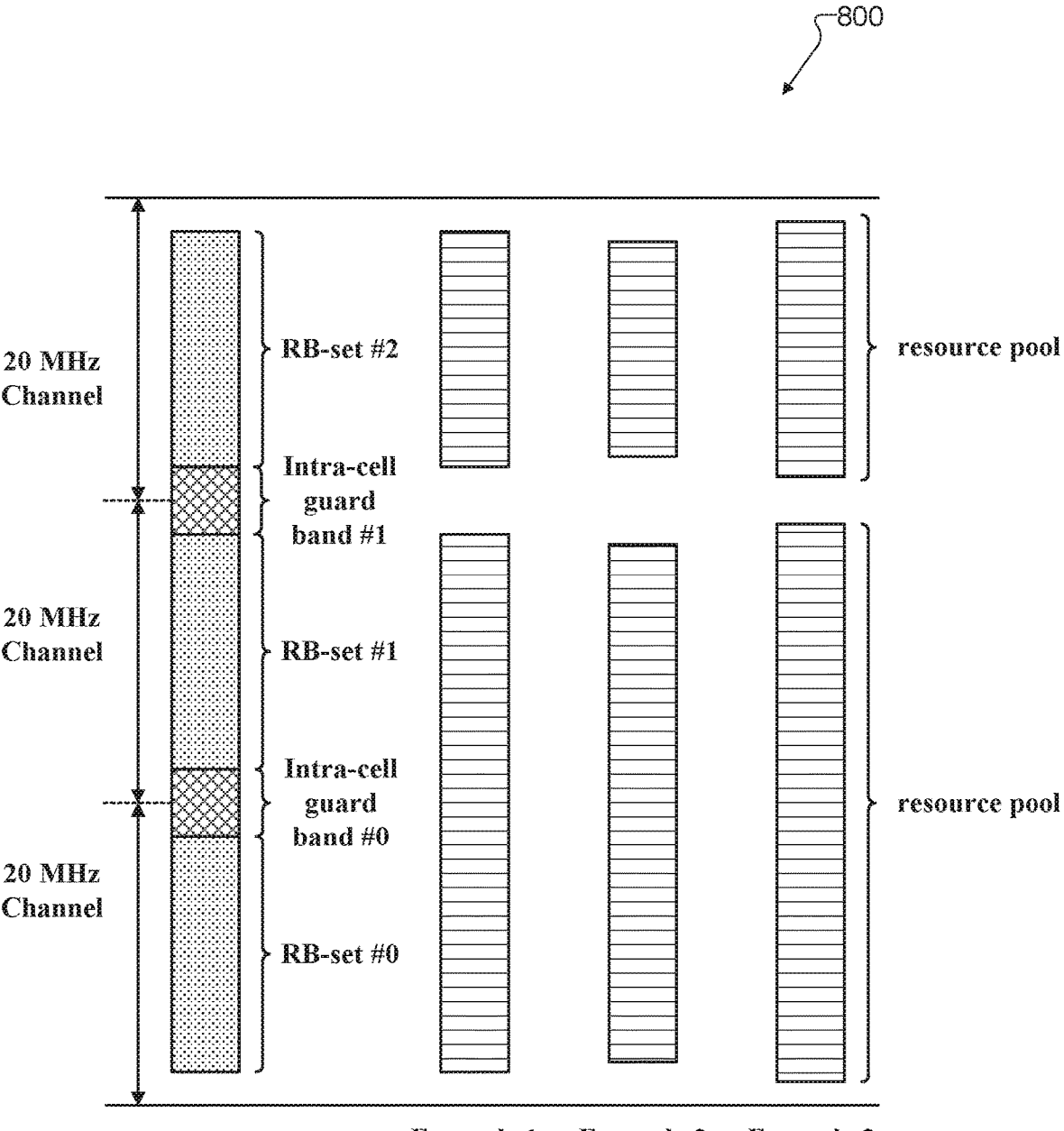
FIG. 8 illustrates another example of a resource pool based on RB-sets according to embodiments of the present disclosure.

FIG. 8 illustrates another example architecture 800 for a resource pool based on RB-sets according to embodiments of the present disclosure. For example, architecture 800 may be utilized by any of the UEs 111-116 to perform SL communications. This example is for illustration only and other embodiments can be used without departing from the scope of the present disclosure.

In one example (an illustration shown in Example 1 of FIG. 8), there can be one or multiple resource pools in the SL BWP, and the boundaries of each resource pool can be aligned with the boundaries of RB-sets included in the SL BWP, e.g. such that the lowest RB of each resource pool is aligned with a lowest RB of a first RB set, and the highest RB of each resource pool is aligned with a highest RB of a second RB set (e.g., the first and second RB set may or may not be the same). For instance, the UE 116 expects each resource pool in the BWP satisfies $$N_{RP,i}^{start,\mu}=RB_{s0,SL}^{start,\mu}, N_{RP,i}^{end,\mu}=RB_{s1,SL}^{end,\mu}, \text{ and}$$
$$N_{RP,i}^{size,\mu}=RB_{s1,SL}^{end,\mu}-RB_{s0,SL}^{start,\mu}+1,$$

where 0≤s0≤s1≤$N_{RB-set,SL}$−1, e.g., the RB-set with index s0 and index s1 both included in the SL BWP. For another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

In another example (an illustration shown in Example 2 of FIG. 8), there can be one or multiple resource pools in the SL BWP, and each resource pool can be confined within a number of RB-sets included in the SL BWP, e.g. such that the lowest RB of each resource pool is no lower than a lowest RB of a RB set, and the highest RB of each resource pool is no higher than a highest RB of a RB set. For instance, the UE 116 expects each resource pool in the BWP satisfies $$N_{RP,i}^{start,\mu}\geq RB_{s0,SL}^{start,\mu}, N_{RP,i}^{end,\mu}\leq RB_{s1,SL}^{end,\mu}, \text{ and}$$
$$N_{RP,i}^{size,\mu}\geq RB_{s1,SL}^{end,\mu}-RB_{s0,SL}^{start,\mu}+1,$$

where 0≤s0≤s1≤$N_{RB-set,SL}$−1, e.g., the RB-set with index s0 and index s1 both included in the SL BWP. For another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

In yet another example (an illustration shown in Example 2 of FIG. 8), there can be one or multiple resource pool in the SL BWP, and each resource pool can include a number of RB-sets included in the SL BWP, e.g., such that the lowest RB of each resource pool is no higher than a lowest RB of a RB set, and the highest RB of each resource pool is no lower than a highest RB of a RB set. For instance, the UE 116 expects each resource pool in the BWP satisfies $$N_{RP,i}^{start,\mu} \leq RB_{s0,SL}^{start,\mu}, N_{RP,i}^{end,\mu} \geq RB_{s1,SL}^{end,\mu}, \text{ and}$$
$$N_{RP,i}^{size,\mu} \leq RB_{s1,SL}^{end,\mu} - RB_{s0,SL}^{start,\mu} + 1,$$

where $0 \leq s0 \leq s1 \leq N_{RB-set,SL} - 1$, e.g., the RB-set with index s0 and index s1 both included in the SL BWP. For another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

In one embodiment, for the example of a resource pool based on the RB-sets, the interval between neighboring resource pools in the frequency domain can satisfy the requirement on the minimum value of the intra-cell guard band.

In one embodiment, there can be additional values supported for the size of a sub-channel in the number of RBs (e.g., sl-SubchannelSize), in addition to the values supported as {10, 12, 15, 20, 25, 75, 100}. In one instance, the supporting of additional values can be applicable to at least one of a contiguous RB based or interlaced RB based resource pool.

For one example, an additional value of the size of a sub-channel in the number of RBs (e.g., sl-SubchannelSize) can be 11.

For another example, an additional value of the size of a sub-channel in the number of RBs (e.g., sl-SubchannelSize) can be 7.

Figure 9:
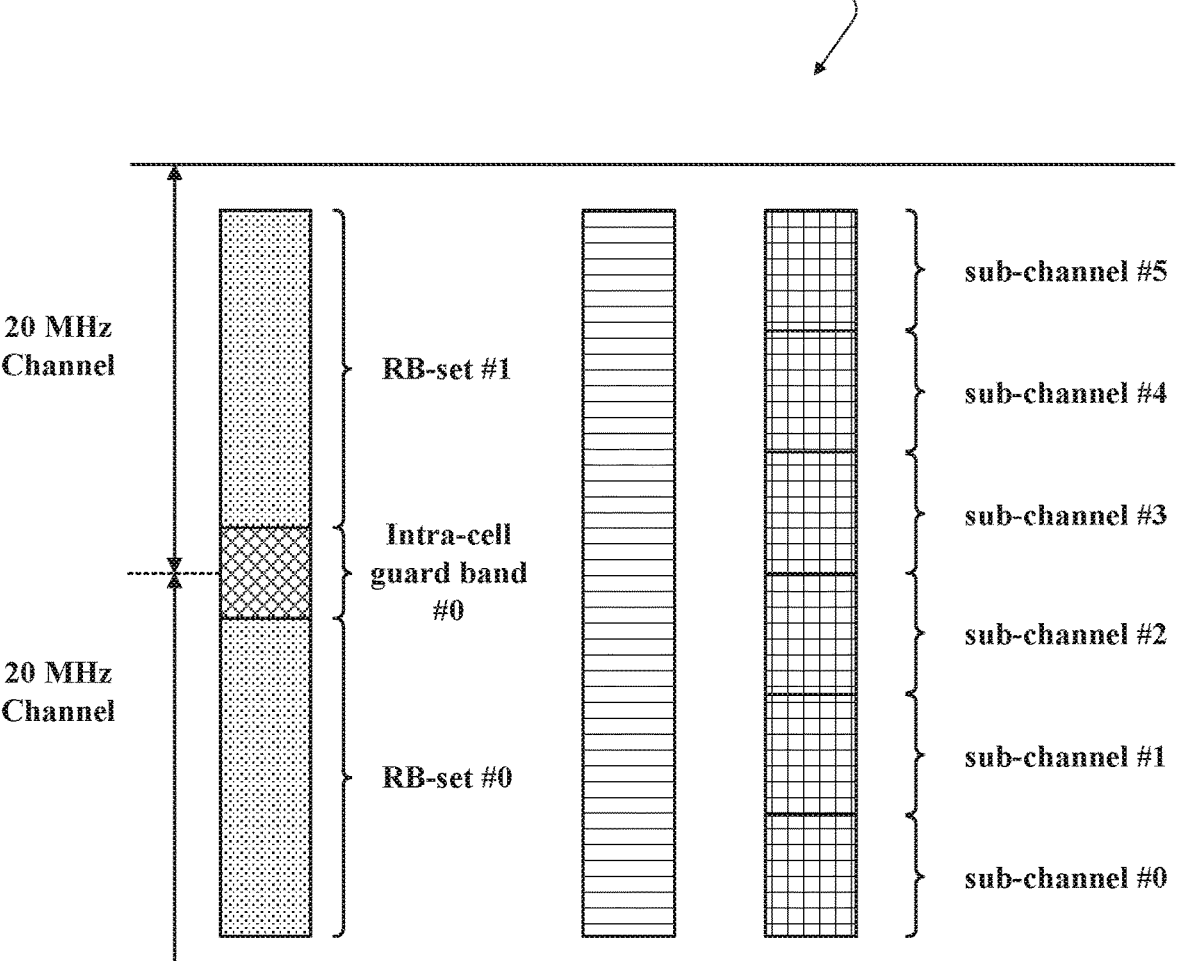
FIG. 9 illustrates an example of a sub-channel in a contiguous RB based resource pool according to embodiments of the present disclosure.

FIG. 9 illustrates an example architecture 900 for a sub-channel in a contiguous RB based resource pool according to embodiments of the present disclosure. For example, architecture 900 may be utilized by any of the UEs 111-116 to perform SL communications. This example is for illustration only and other embodiments can be used without departing from the scope of the present disclosure.

In one embodiment, for a contiguous RB based resource pool across multiple RB-sets, intra-cell guard band(s) can overlap with sub-channels in the resource pool.

For one example, sub-channel(s) in the resource pool are indexed contiguously from the lowest frequency to the highest frequency (e.g., lowest sub-channel starts from the lowest RB within the resource pool).

For another example, sub-channel(s) in each RB set are indexed contiguously from the lowest frequency to the highest frequency, and then the RB set is indexed contiguously from the lowest frequency to the highest frequency.

For yet another example, each sub-channel in the resource pool has the same number of RBs (e.g., the number of RBs for each sub-channel can be provided by a (pre-)configuration).

For one example, when a channel access procedure succeeds in at least two neighboring RB-sets, the RBs in the intra-cell guard band(s) can be used for SL transmission and/or reception (e.g., PSSCH and/or PSCCH), wherein the intra-cell guard band(s) are the one(s) associated with the at least two neighboring RB-sets (e.g., located in between the at least two neighboring RB-sets).

For another example, when the RBs in the intra-cell guard band(s) are not used for SL transmission and/or reception (e.g., due to failed channel access procedure or scheduling not to use such RBs), SL transmission and/or reception (e.g., PSSCH or PSCCH) can use the RBs in the sub-channel(s) wherein the sub-channel(s) are located within the RB-set(s) and not overlapping with the intra-cell guard band(s). For this example, sub-channel(s) overlapping with intra-cell guard band(s) are not used for SL transmission and/or reception (e.g., PSSCH or PSCCH).

For yet another example, the sub-channel(s) overlapping with intra-cell guard band(s) are not used for PSFCH and/or S-SS/PSBCH block (e.g., if a PSFCH and/or S-SS/PSBCH block transmission or reception overlaps with sub-channel(s) overlapping with intra-cell guard band(s), the PSFCH and/or S-SS/PSBCH block transmission or reception are dropped).

For yet another example, RBs in the intra-cell guard band(s) are not used for PSFCH and/or S-SS/PSBCH block transmission, and RBs in the sub-channel(s) overlapping with intra-cell guard band(s) but not included in the intra-cell guard band(s) can be used for PSFCH and/or S-SS/PSBCH block transmission.

Figure 10:
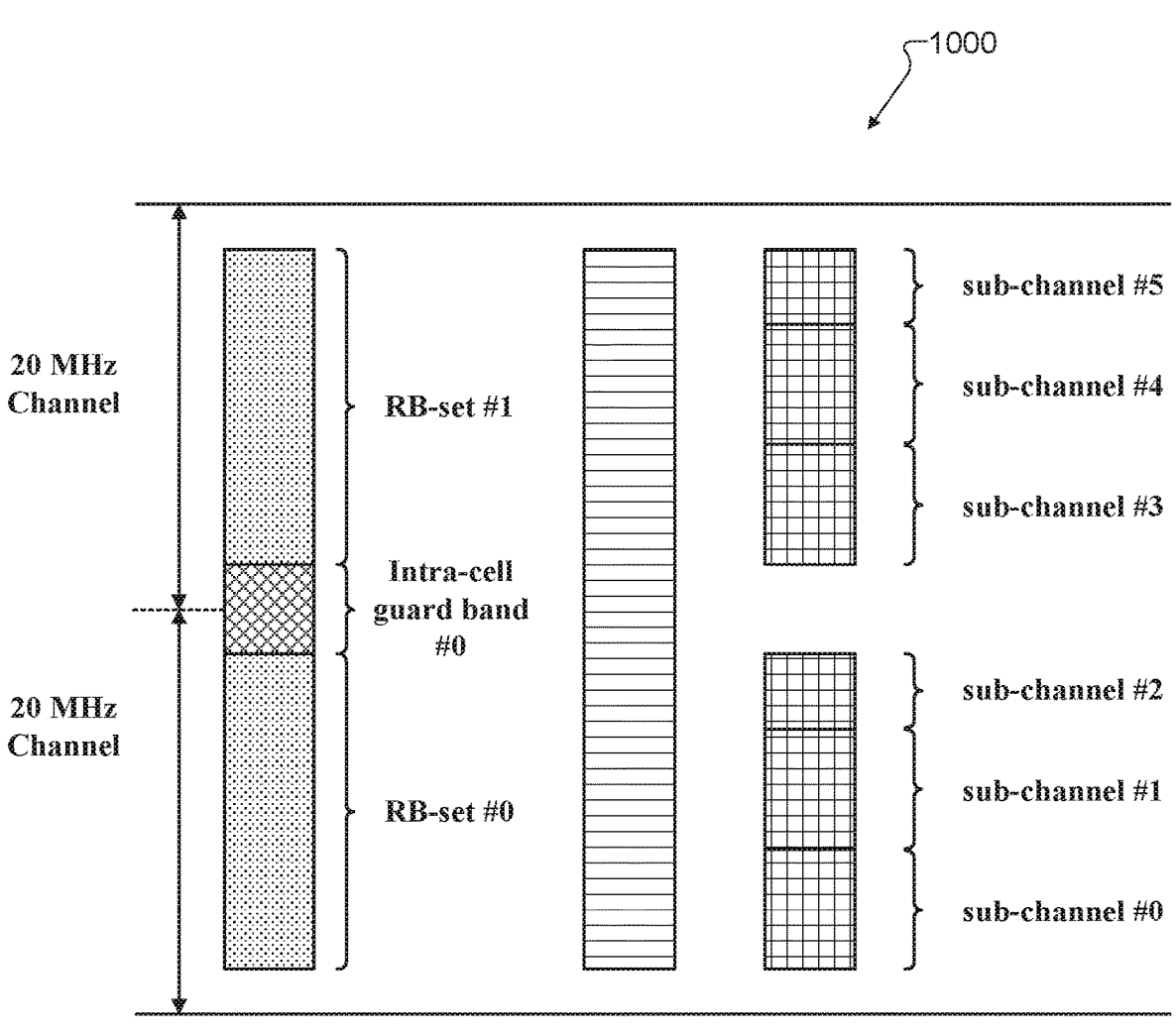
FIG. 10 illustrates another example of a sub-channel in a contiguous RB based resource pool according to embodiments of the present disclosure.

FIG. 10 illustrates another example architecture 1000 for a sub-channel in a contiguous RB based resource pool according to embodiments of the present disclosure. For example, architecture 1000 may be utilized by any of the UEs 111-116 to perform SL communications. This example is for illustration only and other embodiments can be used without departing from the scope of the present disclosure.

Referring to FIG. 10, in another embodiment, for a contiguous RB based resource pool across multiple RB-sets, sub-channel(s) are included only in RB-set(s), and no sub-channel overlaps with intra-cell guard band(s).

For one example, the last sub-channel (e.g., with highest frequency) can be with different RB sizes as the remaining sub-channel(s) in the RB-set.

For another example, each sub-channel in the resource pool has the same number of RBs (e.g., the number of RBs for each sub-channel can be provided by a (pre-)configuration).

For one example, sub-channel(s) in the resource pool are indexed contiguously from the lowest frequency to the highest frequency.

For another example, sub-channel(s) in each RB set are indexed contiguously from the lowest frequency to the highest frequency, and then the RB set is indexed contiguously from the lowest frequency to the highest frequency.

For one example, when a channel access procedure succeeds in at least two neighboring RB-sets, the RBs in the intra-cell guard band(s) can be used for SL transmission (e.g., PSSCH/PSCCH transmission), wherein the intra-cell guard band(s) are the one(s) associated with the at least two neighboring RB-sets (e.g., located in between the at least two neighboring RB-sets). In one instance, those RBs can be used only for PSSCH transmission.

For another example, when the RBs in the intra-cell guard band(s) are not used for SL transmission (e.g., due to failed channel access procedure or scheduling not to use such RBs), SL transmission (e.g., PSSCH/PSCCH transmission) can use the RBs in the sub-channel(s) in the RB-set(s). In one instance, for the sub-channel(s) including RBs in the intra-cell guard band(s) and also including RBs in the RB-set(s), the RBs overlapping with the intra-cell guard band(s) are not used for SL transmission (e.g., PSSCH/PSCCH transmission), and the RBs overlapping with RB-set(s) can be used for SL transmission (e.g., PSSCH transmission only or for both PSSCH and PSCCH transmissions).

For yet another example, only sub-channel(s) are used for PSFCH and/or S-SS/PSBCH block transmission, and intra-cell guard band(s) are not used for PSFCH and/or S-SS/PSBCH block transmission.

Figure 11:
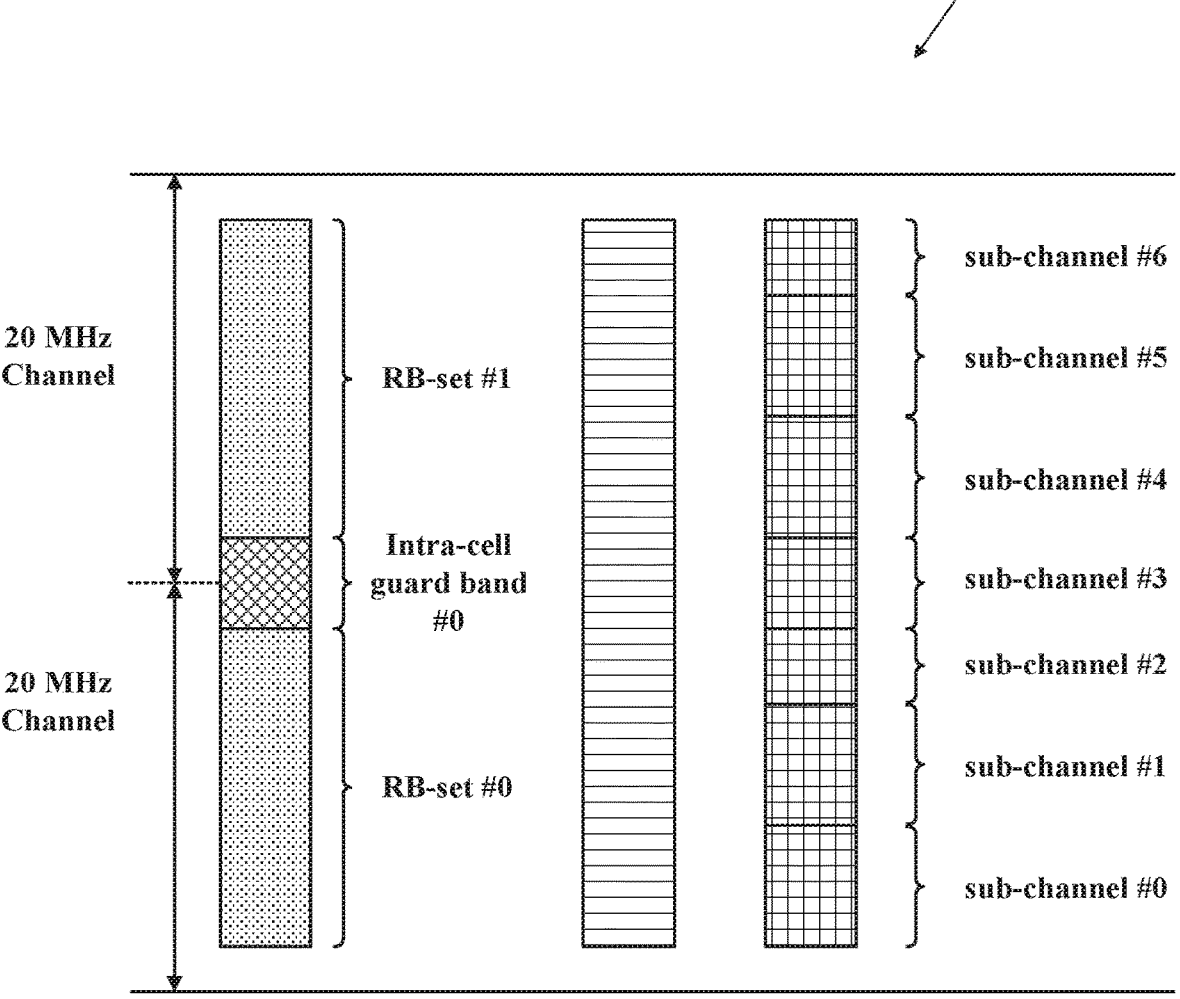
FIG. 11 illustrates another example of a sub-channel in a contiguous RB based resource pool.

FIG. 11 illustrates another example architecture 1100 for a sub-channel in a contiguous RB based resource pool. For example, architecture 1100 may be utilized by any of the UEs 111-116 to perform SL communications. This example is for illustration only and other embodiments can be used without departing from the scope of the present disclosure.

Referring to FIG. 11, in yet another embodiment for a contiguous RB based resource pool across multiple RB-sets, sub-channel(s) are included in RB-set(s) and intra-cell guard band(s), wherein in each RB-set and intra-cell guard.

For one example, the last sub-channel (e.g., with highest frequency) can be with different RB sizes as the remaining sub-channel(s) in the RB-set.

For another example, the last sub-channel (e.g., with highest frequency) can be with different RB sizes as the remaining sub-channel(s) in the intra-cell guard band(s).

For another example, each sub-channel in the resource pool has same number of RBs.

For one example, sub-channel(s) in the resource pool are indexed contiguously from the lowest frequency to the highest frequency.

For another example, sub-channel(s) in each RB set are indexed contiguously from the lowest frequency to the highest frequency, and then the RB set is indexed contiguously from the lowest frequency to the highest frequency.

For yet another example, sub-channel(s) in each intra-cell guard band are indexed contiguously from the lowest frequency to the highest frequency, and then the intra-cell guard band is indexed contiguously from the lowest frequency to the highest frequency.

For one example, when channel access procedure succeeds in at least two neighboring RB-sets, the RBs in the intra-cell guard band(s) can be used for SL transmission (e.g., PSSCH/PSCCH transmission), wherein the intra-cell guard band(s) are the one(s) associated with the at least two neighboring RB-sets (e.g., located in between the at least two neighboring RB-sets).

For another example, when the RBs in the intra-cell guard band(s) are not used for SL transmission (e.g., due to failed channel access procedure or scheduling not to use such RBs), SL transmission (e.g., PSSCH/PSCCH transmission) can use the RBs in the sub-channel(s) in the RB-set(s).

For yet another example, only sub-channel(s) in RB-set(s) are used for PSFCH and/or S-SS/PSBCH block transmission, and intra-cell guard band(s) are not used for PSFCH and/or S-SS/PSBCH block transmission.

In one embodiment for an interlaced RB based resource pool, the resource pool can be determined based on the RB-sets. For instance, the resource pool can be a set of sub-channels, wherein the sub-channel can be determined based on at least one or more of the examples described herein.

Figure 12:
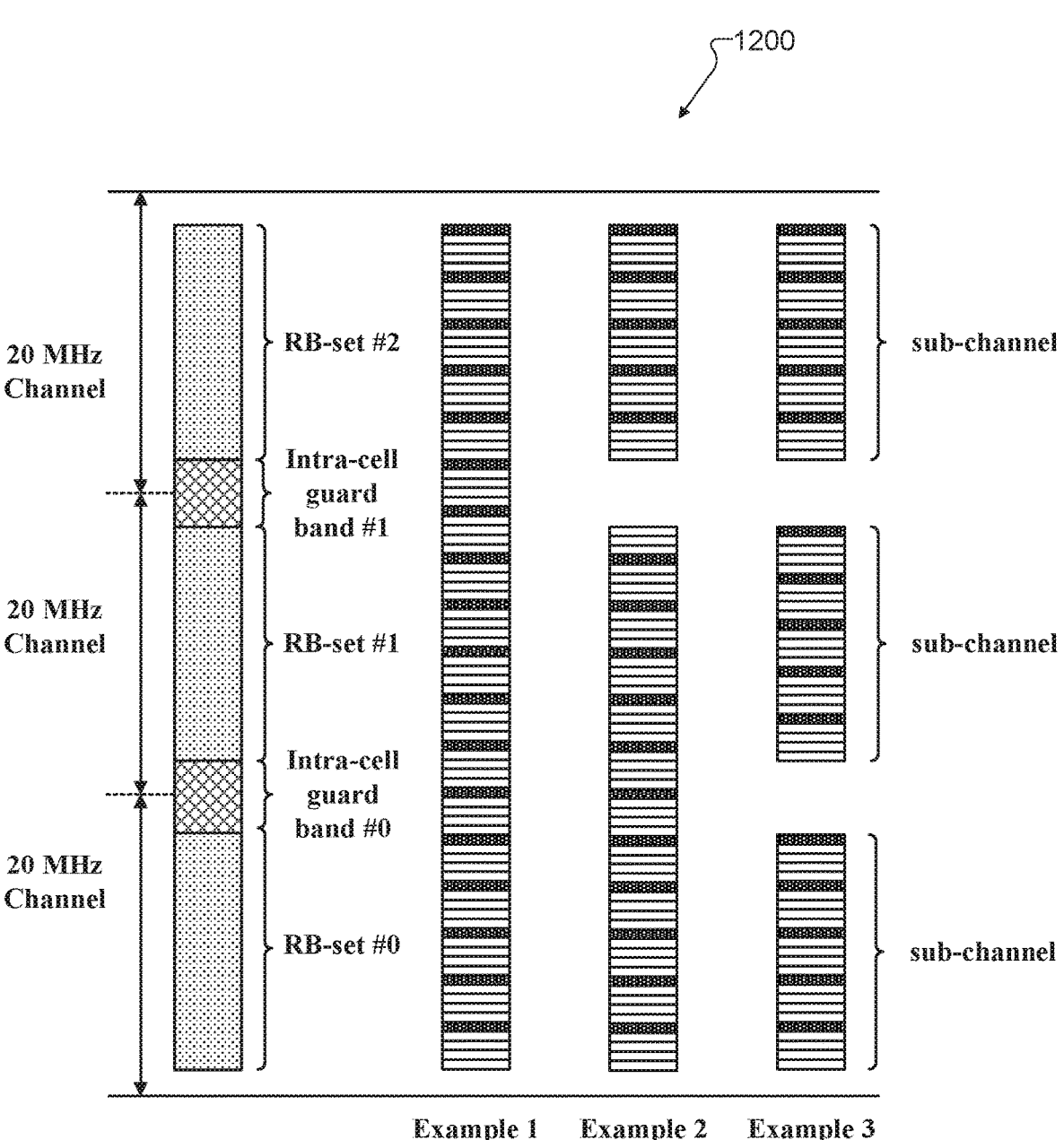
FIG. 12 illustrates an example of an interlaced based sub-channel based on RB-sets according to embodiments of the present disclosure.

FIG. 12 illustrates an example architecture 1200 for an interlaced based sub-channel 1200 based on RB-sets according to embodiments of the present disclosure. For example, architecture 1200 may be utilized by any of the UEs 111-116 to perform SL communications. This example is for illustration only and other embodiments can be used without departing from the scope of the present disclosure.

In one example, a sub-channel can be determined as one or multiple interlaces, wherein one interlace includes a set of RBs in the SL BWP with a uniform interval. An illustration of this example is shown in Example 1 of FIG. 12. For one instance, the index of sub-channel is common across the RB-sets in the SL BWP, e.g., $i_{sub-channel}$ is determined based on the interlace index within the SL BWP given by $i_{sub-channel}=\text{floor}(i_{interlace}/N_{interlace})$, wherein $i_{interlace}$ is the interlace index within the SL BWP, and $N_{interlace}^{sub-channel}$ is the number of interlaces in a sub-channel.

In another example, a sub-channel can be determined as an intersection of a set of RB-sets (or partial of the RBs in the set of RB-set), including the associated intra-cell guard bands, and one or multiple interlaces, wherein one interlace includes a set of RBs in the SL BWP with a uniform interval. For this example, a sub-channel can be determined based on index(es) of the one or multiple interlaces and the index(s) of the set of RB-sets. For one instance, the one or multiple interlaces can be provided by a higher layer parameter or a pre-configuration. For another instance, the RB-sets can be provided by a higher layer parameter or a pre-configuration. For yet another instance, the set of RB-sets can be contiguous RB-sets. An illustration of this example is shown in Example 2 of FIG. 12. For one instance, the index of sub-channel is common across the one or multiple RB-sets in the SL BWP, e.g., $i_{sub-channel}$ is determined based on the interlace index within the SL BWP given by $i_{sub-channel}=\text{floor}(i_{interlace}/N_{interlace})$, wherein $i_{interlace}$ is the interlace index within the SL BWP, and $N_{interlace}^{sub-channel}$ is the number of interlaces in a sub-channel.

In yet another example, a sub-channel can be determined as an intersection of one RB-set (or partial of the RBs in one RB-set) and one or multiple interlaces, wherein one interlace includes a set of RBs in the SL BWP with a uniform interval. For this example, a sub-channel can be determined based on index(es) of the one or multiple interlaces and the index of the RB-set. For one instance, the one or multiple interlaces can be provided by a higher layer parameter or a pre-configuration. For another instance, the RB-set can be provided by a higher layer parameter or a pre-configuration. An illustration of this example is shown in Example 3 of FIG. 12. For one instance, the index of the sub-channel(s) can be given by $i_{sub-channel}^{RB-set}+i^{RB-set}\cdot N_{sub-channel}^{RB-set}$, wherein $i_{sub-channel}^{RB-set}$ is the sub-channel index within a RB-set, $i^{RB-set}$ is the RB-set index, and $N_{sub-channel}^{RB-set}$ is the number of sub-channels in a RB-set. For another instance, the index of the sub-channel(s) can be given by two parts: $i_{sub-channel}^{RB-set}$ is the sub-channel index within a RB-set, and $i^{RB-set}$ is the RB-set index. For one further consideration, $i_{sub-channel}^{RB-set}$ corresponds to the same set of interlaces in different RB-sets, for instance, $i_{sub-channel}^{RB-set}$ is determined based on the interlace index within the SL BWP given by $i_{sub-channel}^{RB-set}=\text{floor}(i_{interlace}/N_{interlace}^{sub-channel})$, wherein $i_{interlace}$ is the interlace index within the SL BWP, and $N_{interlace}^{sub-channel}$ is the number of interlaces in a sub-channel.

In yet another example, a sub-channel can be determined as an intersection of a set of RB-sets (or partial of the RBs in the set of RB-set), excluding the associated intra-cell guard bands, and one or multiple interlaces, wherein one interlace includes a set of RBs in the SL BWP with a uniform interval. For this example, a sub-channel can be determined based on index(es) of the one or multiple interlaces and the index(s) of the set of RB-sets. For one instance, the one or multiple interlaces can be provided by a higher layer parameter or a pre-configuration. For another instance, the RB-sets can be provided by a higher layer parameter or a pre-configuration. For yet another instance, the set of RB-sets can be contiguous RB-sets.

In yet another example, at least one of the examples described herein can be supported. For one instance, if the index(s) of the set of RB-sets or the index of the RB-set is provided, the sub-channel can be determined in a first manner (e.g., according to Example 2 or Example 3 of FIG. 12); if the index(s) of the set of RB-sets or the index of the RB-set is not provided, the sub-channel can be determined in a second manner (e.g., according Example 1 of FIG. 12). For another instance, at least one of the examples described herein can be supported, and which one(s) are supported can be provided by a higher layer parameter or a pre-configuration.

In one further consideration, when a channel access procedure succeeds in at least two neighboring RB-sets, the RBs in the intra-cell guard band(s) can be used for SL transmission and/or reception (e.g., PSSCH and/or PSCCH), wherein the intra-cell guard band(s) are the one(s) associated with the at least two neighboring RB-sets (e.g., located in between the at least two neighboring RB-sets). The RBs in the intra-cell guard band(s) are located in the same interlace as the RBs in the RB-sets for SL transmission and/or reception (e.g., PSSCH and/or PSCCH).

In another further consideration, when the RBs in the intra-cell guard band(s) are not used for SL transmission and/or reception (e.g., due to failed channel access procedure or scheduling not to use such RBs), SL transmission and/or reception (e.g., PSSCH and/or PSCCH) can use the RBs in the sub-channel(s) overlapping with the RB-set(s), wherein the channel access procedure succeeds on the channel(s) including the RB-set(s). For this example, RBs in the sub-channel(s) overlapping with intra-cell guard band(s) are not used for SL transmission and/or reception (e.g., PSSCH and/or PSCCH).

In yet another further consideration, the RBs in the sub-channel(s) overlapping with intra-cell guard band(s) are not used for PSFCH and/or S-SS/PSBCH block transmission and/or reception.

In one example, the resource pool includes RBs in all interlaces intersected with the one or multiple RB-set.

In another example, the resource pool can include RBs in part of or all interlaces intersected with the one or multiple RB-set. For instance, the set of interlaces can be provided by a higher layer parameter or a pre-configuration.

In one example, if the resource pool includes a RB in an interlace intersected with an RB-set, then the resource pool includes all RBs in the interlace intersected with the RB-set. For instance, the resource pool may not include partial of the RBs in an interlace intersected with a RB-set.

In one example, when an interlaced RB based resource pool includes RBs of an interlaced intersection with two neighboring RB-sets (e.g., RB-sets with index s and s+1), the interlaced RB based resource pool also includes the RBs of the interlace intersected with the intra-cell guard band between the two neighboring RB-sets (e.g., intra-cell guard band with index s).

In one example (an illustration shown in Example 1 of FIG. 8), there is a single resource pool in the SL BWP, and the resource pool includes all interlaces in the SL BWP such that the RBs in the resource pool are contiguous, and the boundaries of the single resource pool can be aligned with the boundaries of RB-sets included in the SL BWP, e.g. such that the lowest RB of the resource pool is aligned with a lowest RB of a RB set, and the highest RB of the resource pool is aligned with a highest RB of a RB set. For instance, the UE 116 expects the resource pool in the BWP satisfies $$N_{RP}^{start,\mu}=RB_{s0,SL}^{start,\mu}, N_{RP}^{end,\mu}=RB_{s1,SL}^{end,\mu}, \text{ and}$$
$$N_{RP}^{size,\mu}=RB_{s1,SL}^{end,\mu}-RB_{s0,SL}^{start,\mu}+1,$$

where $0\leq s0\leq s1\leq N_{RB\text{-}set,SL}-1$, e.g., the RB-set with index s0 corresponds to the lowest RB-set in the SL BWP and the RB-set with index s1 corresponds to the highest RB-set in the SL BWP. For another instance, the single resource pool can be the same as the BWP in the frequency domain. For yet another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

In another example (an illustration shown in Example 2 of FIG. 8), there is a single resource pool in the SL BWP, and the resource pool includes all interlaces in the SL BWP such that the RBs in the resource pool are contiguous, and the single resource pool can be confined within a number of RB-sets included in the SL BWP, e.g. such that the lowest RB of the resource pool is no lower than a lowest RB of a RB set, and the highest RB of the resource pool is no higher than a highest RB of a RB set. For instance, the UE 116 expects the resource pool in the BWP satisfies $$N_{RP}^{start,\mu}\geq RB_{s0,SL}^{start,\mu}, N_{RP}^{end,\mu}\leq RB_{s1,SL}^{end,\mu}, \text{ and}$$
$$N_{RP}^{size,\mu}\geq RB_{s1,SL}^{end,\mu}-RB_{s0,SL}^{start,\mu}+1,$$

where $0\leq s0\leq s1\leq N_{RB\text{-}set,SL}-1$, e.g., the RB-set with index s0 corresponds to the lowest RB-set in the SL BWP and the RB-set with index s1 corresponds to the highest RB-set in the SL BWP. For another instance, the single resource pool can be the same as the BWP in the frequency domain. For yet another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

In yet another example (an illustration shown in Example 3 of FIG. 8), there is a single resource pool in the SL BWP, and the resource pool includes all interlaces in the SL BWP such that the RBs in the resource pool are contiguous, and the single resource pool can include a number of RB-sets included in the SL BWP, e.g. such that the lowest RB of the resource pool is no higher than a lowest RB of a RB set, and the highest RB of the resource pool is no lower than a highest RB of a RB set. For instance, the UE 116 expects the resource pool in the BWP satisfies $$N_{RP}^{start,\mu}\leq RB_{s0,SL}^{start,\mu}, N_{RP}^{end,\mu}\geq RB_{s1,SL}^{end,\mu}, \text{ and}$$
$$N_{RP}^{size,\mu}\leq RB_{s1,SL}^{end,\mu}-RB_{s0,SL}^{start,\mu}+1,$$

where $0\leq s0\leq s1\leq N_{RB\text{-}set,SL}-1$, e.g., the RB-set with index s0 corresponds to the lowest RB-set in the SL BWP and the RB-set with index s1 corresponds to the highest RB-set in the SL BWP. For another instance, the single resource pool can be the same as the BWP in the frequency domain. For yet another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

In one example (an illustration shown in Example 1 of FIG. 8), there can be one or multiple resource pools in the SL BWP, and each resource pool includes all interlaces in the corresponding RB-sets such that the RBs in each resource pool are contiguous, and the boundaries of each resource pool can be aligned with the boundaries of RB-sets included in the SL BWP, e.g. such that the lowest RB of each resource pool is aligned with a lowest RB of a first RB set, and the highest RB of each resource pool is aligned with a highest RB of a second RB set (e.g., the first RB set and the second RB set may or may not be the same). For instance, the UE 116 expects each resource pool in the BWP satisfies $$N_{RP,i}^{start,\mu}=RB_{s0,SL}^{start,\mu}, N_{RP,i}^{end,\mu}=RB_{s1,SL}^{end,\mu}, \text{ and }$$
$$N_{RP,i}^{size,\mu}=RB_{s1,SL}^{end,\mu}-RB_{s0,SL}^{start,\mu}+1,$$

where $0 \leq s0 \leq s1 \leq N_{RB-set,SL}-1$, e.g., the RB-set with index s0 and index s1 both included in the SL BWP. For another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

In another example (an illustration shown in Example 2 of FIG. 8), there can be one or multiple resource pools in the SL BWP, and each resource pool includes all interlaces in the corresponding RB-sets such that the RBs in each resource pool are contiguous, and each resource pool can be confined within a number of RB-sets included in the SL BWP, e.g. such that the lowest RB of each resource pool is no lower than a lowest RB of a RB set, and the highest RB of each resource pool is no higher than a highest RB of a RB set. For instance, the UE 116 expects each resource pool in the BWP satisfies $$N_{RP,i}^{start,\mu}=RB_{s0,SL}^{start,\mu}, N_{RP,i}^{end,\mu}=RB_{s1,SL}^{end,\mu}, \text{ and }$$
$$N_{RP,i}^{size,\mu}=RB_{s1,SL}^{end,\mu}-RB_{s0,SL}^{start,\mu}+1,$$

where $0 \leq s0 \leq s1 \leq N_{RB-set,SL}-1$, e.g., the RB-set with index s0 and index s1 both included in the SL BWP. For another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

In yet another example (an illustration shown in Example 3 of FIG. 8), there can be one or multiple resource pools in the SL BWP, and each resource pool includes all interlaces in the corresponding RB-sets such that the RBs in each resource pool are contiguous, and each resource pool can include a number of RB-sets included in the SL BWP, e.g. such that the lowest RB of each resource pool is no higher than a lowest RB of a RB set, and the highest RB of each resource pool is no lower than a highest RB of a RB set. For instance, the UE 116 expects each resource pool in the BWP satisfies $$N_{RP,i}^{start,\mu} \leq RB_{s0,SL}^{start,\mu}, N_{RP,i}^{end,\mu} \geq RB_{s1,SL}^{end,\mu}, \text{ and }$$
$$N_{RP,i}^{size,\mu} \leq RB_{s1,SL}^{end,\mu}-RB_{s0,SL}^{start,\mu}+1,$$

where $0 \leq s0 \leq s1 \leq N_{RB-set,SL}-1$, e.g., the RB-set with index s0 and index s1 both included in the SL BWP. For another instance, when the resource pool includes RBs from two neighboring RB-sets (e.g., the two neighboring RB-sets are with index s and s+1), the resource pool can also include RBs from the intra-cell guard band between the neighboring RB-sets (e.g., the intra-cell guard band is with index s).

Figure 13:
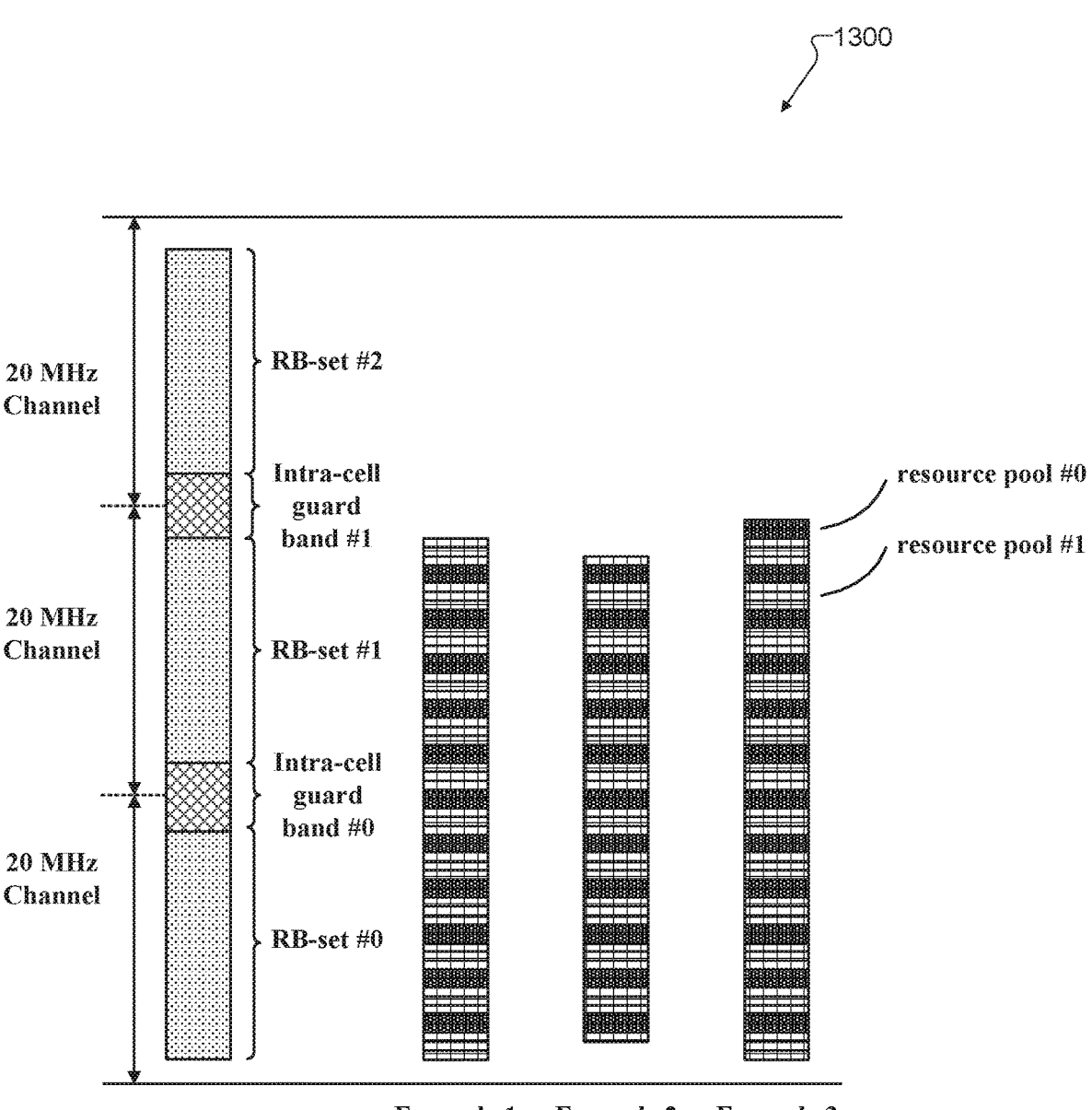
FIG. 13 illustrates another example of a resource pool based on RB-sets according to embodiments of the present disclosure.

FIG. 13 illustrates another example architecture 1300 for a resource pool based on RB-sets according to embodiments of the present disclosure. For example, architecture 1300 may be utilized by any of the UEs 111-116 to perform SL communications. This example is for illustration only and other embodiments can be used without departing from the scope of the present disclosure.

In one example (an illustration shown in Example 1 of FIG. 13), there can be one or multiple resource pools in the SL BWP, and each resource pool includes a set of interlaces in the corresponding RB-sets (such that the RBs in each resource pool may or may not be contiguous), and the set of RBs in the resource pool can be given by {m, m+M, . . . , m+kM}, where M is the uniform interval for the interlace, and m determines the index of the interlace, e.g. ((m−$N_{BWP,SL}^{start,\mu}$)mod M)∈S where $N_{BWP,SL}^{start,\mu}$ is the starting RB of the SL BWP and S is the set of interlaces. The set of RBs {m, m+M, . . . , m+kM} should be selected between interval [a,b], where a=$RB_{s0,SL}^{start,\mu}$ and b=$RB_{s1,SL}$, and $0 \leq s0 \leq s1 \leq N_{RB-set,SL}-1$, e.g. the RB-set with index s0 and index s1 both included in the SL BWP. For this example, the resource pool can be determined based on an indication of a set of interlaces and a set of RB-sets. For one instance, the set of interlaces can be provided or determined by a higher layer parameter or a pre-configuration. For another instance, the set of RB-sets can be provided by a higher layer parameter or a pre-configuration. For a special instance of this example, s0=0 and s1=$N_{RB-set,SL}-1$, e.g., the set of RB-sets corresponds to all the RB-sets in the SL BWP. For yet another instance, two resource pools can be IFDMed in the SL BWP.

In another example (an illustration shown in Example 2 of FIG. 13), there can be one or multiple resource pools in the SL BWP, and each resource pool includes a set of interlaces in the corresponding RB-sets (such that the RBs in each resource pool may or may not be contiguous), and the set of RBs in the resource pool can be given by {m, m+M, . . . , m+kM}, where M is the uniform interval for the interlace, and m determines the index of the interlace, e.g. ((m−$N_{BWP,SL}^{start,\mu}$)mod M)∈S where $N_{BWP,SL}^{start,\mu}$ is the starting RB of the SL BWP and S is the set of interlaces. The set of RBs {m, m+M, . . . , m+kM} should be selected between interval [a, b], where a≥$RB_{s0,SL}^{start,\mu}$ and b≤$RB_{s1,SL}^{end,\mu}$, $0 \leq s0 \leq s1 \leq N_{RB-set,SL}-1$, e.g. the RB-set with index s0 and index s1 both included in the SL BWP. For this example, the resource pool can be determined based on an indication of a set of interlaces and a set of RB-sets. For one instance, the set of interlaces can be provided or determined by a higher layer parameter or a pre-configuration. For another instance, the set of RB-sets can be provided by a higher layer parameter or a pre-configuration. For a special instance of this example, s0=0 and s1=$N_{RB-set,SL}-1$, e.g., the set of RB-sets corresponds to all the RB-sets in the SL BWP. For yet another instance, two resource pools can be IFDMed in the SL BWP.

In yet another example (an illustration shown in Example 3 of FIG. 13), there can be one or multiple resource pools in the SL BWP, and each resource pool includes a set of interlaces in the corresponding RB-sets (such that the RBs in each resource pool may or may not be contiguous), and the set of RBs in the resource pool can be given by {m, m+M, . . . , m+kM}, where M is the uniform interval for the interlace, and m determines the index of the interlace, e.g. ((m−$N_{BWP,SL}^{start,\mu}$)mod M)∈S where $N_{BWP,SL}^{start,\mu}$ is the starting RB of the SL BWP and S is the set of interlaces. The set of RBs {m, m+M, . . . , m+kM} should be selected between interval [a, b], where a≤$RB_{s0,SL}^{start,\mu}$ and b≥$RB_{s1,SL}^{end,\mu}$, $0 \leq s0 \leq s1 \leq N_{RB-set,SL}-1$, e.g. the RB-set with index s0 and index s1 both included in the SL BWP. For this example, the resource pool can be determined based on an indication of a set of interlaces and a set of RB-sets. For one instance, the set of interlaces can be provided or determined by a higher layer parameter or a pre-configuration. For another instance, the set of RB-sets can be provided by a higher layer parameter or a pre-configuration. For a special instance of this example, s0=0 and s1=$N_{RB-set,SL}-1$, e.g., the set of RB-sets corresponds to all the RB-sets in the SL BWP. For yet another instance, two resource pools can be IFDMed in the SL BWP.

In one embodiment, a sidelink synchronization signal and physical sidelink broadcast channel block (S-SS/PSBCH block or S-SSB) can be supported based on the RB-sets.

In one example, a UE can be provided with one interlace index and one RB-set index to transmit or receive the S-SS/PSBCH block. For this example, the S-SS/PSBCH block (e.g., with 11 RBs) can be mapped to the RBs in the intersection of the interlace and RB-set.

For one instance, the UE 116 doesn't expect the number of RBs in the intersection of the interlace and RB-set to be smaller than 11 (e.g., 10).

For another instance, if the number of RBs in the intersection of the interlace and RB-set is smaller than 11, the S-SS/PSBCH block can be truncated by 12 REs and mapped to the RBs in the intersection of the interlace and RB-set.

For yet another instance, if the number of RBs in the intersection of the interlace and RB-set is smaller than 11, the UE 116 would select one RB from an intra-cell guard band and within the same interlace, and map the 11 RBs of the S-SS/PSBCH block into the RBs in the intersection of the interlace and RB-set as well as the RB from the intra-cell guard band.

In one sub-instance, the intra-cell guard band can be the one next to the RB-set and with lower frequency than the RB-set (e.g., the intra-cell guard band with index s−1 and the RB-set with index s).

In another sub-instance, the intra-cell guard band can be the one next to the RB-set and with higher frequency than the RB-set (e.g., the intra-cell guard band with index s and the RB-set with index s).

In yet another sub-instance, the intra-cell guard band can be the one next to the RB-set, either with a higher frequency than the RB-set or with a lower frequency than the RB-set.

In yet another sub-instance, the intra-cell guard band can be the one next to the RB-set, either with a higher frequency than the RB-set or with a lower frequency than the RB-set, subject to an indication provided by higher layer parameters or pre-configuration.

In one sub-instance, the one RB selected from the intra-cell guard band can be within the range of $[RB_{s,SL}^{start,\mu}-[GB_{s-1,SL}^{size,\mu}/2], RB_{s,SL}^{start,\mu}-1]$, when the intra-cell guard band is with lower frequency than the RB-set.

In another sub-instance, the one RB selected from the intra-cell guard band can be within the range of $[RB_{s,SL}^{end,\mu}+1, RB_{s,SL}^{end,\mu}+\lfloor GB_{s,SL}^{size,\mu}/2\rfloor]$, when the intra-cell guard band is with higher frequency than the RB-set.

In one sub-instance, the one RB selected from the intra-cell guard band can be used for the S-SS/PSBCH block transmission when the other RB-set next to the intra-cell guard band is also included in the SL BWP, e.g., the RB-set configured for the S-SS/PSBCH block transmission is with index s. Then the intra-cell guard band with index s−1 can be used when RB-set with index s−1 is also included in the SL BWP, or the intra-cell guard band with index s can be used when RB-set with index s+1 is also included in the SL BWP.

In another example, a UE can be provided with one or multiple interlace indexes and one RB-set index to transmit or receive the S-SS/PSBCH block. For this example, the S-SS/PSBCH block (e.g., with 11 RBs) can be mapped to the RBs in the intersection of the set of interlace and the one RB-set.

For one instance, the UE 116 maps the 11 RBs of the S-SS/PSBCH block into the RBs in the intersection of the one or multiple interlace and RB-set, first in an order of lower to higher RBs in each interlace confined within the RB-set, and then in an order of lowest interlace to higher interlace in the set of interlaces.

For another instance, the UE 116 maps copies of the 11 RBs of the S-SS/PSBCH block into the RBs in the intersection of the one or multiple interlace and RB-set, first in an order of lower to higher RBs in each interlace confined within the RB-set, and then in an order of lowest interlace to higher interlace in the set of interlaces, until all the RBs in the intersection of the one or multiple interlace and RB-set are filled by the RBs of the S-SS/PSBCH block (may or may not use an integer number of 11 RBs).

In yet another example, a UE can be provided with one interlace index and one or more RB-set indexes to transmit or receive the S-SS/PSBCH block. For this example, the S-SS/PSBCH block (e.g., with 11 RBs) can be mapped to the RBs in the intersection of the one interlace and the set of RB-sets.

For one instance, the UE 116 maps the 11 RBs of the S-SS/PSBCH block into the RBs in the intersection of the one interlace and the set of RB-sets (including the intra-cell guard bands), in an order of lower to higher RBs in the one interlace confined within the set of RB-sets (including the intra-cell guard bands).

For another instance, the UE 116 maps the 11 RBs of the S-SS/PSBCH block into the RBs in the intersection of the one interlace and at least one RB-set from the set of RB-sets, in an order of lower to higher RBs in the one interlace confined within the RB-set. For one sub-instance, the UE 116 can select the at least one RB-set to transmit, e.g., the RB-set that has 11 RBs in the intersection with the interlace. For another sub-instance, if the number of RBs in the intersection of the one interlace and the at least one RB-set from the set of RB-sets is smaller than 11, the UE 116 can utilize RB in the intersection of the one interlace and the intra-cell guard band to transmit the S-SS/PSBCH block.

For another instance, the UE 116 maps copies of the 11 RBs of the S-SS/PSBCH block into the RBs in the intersection of the one interlace and the set of RB-sets (including the intra-cell guard bands), in an order of lower to higher RBs in the one interlace confined within the set of RB-sets (including the intra-cell guard bands), until all the RBs in the one interlace confined within the set of RB-sets (including the intra-cell guard bands) are filled by the RBs of the S-SS/PSBCH block (may or may not use an integer number of 11 RBs).

For yet another instance, the UE 116 maps copies of the 11 RBs of the S-SS/PSBCH block into the RBs in the intersection of the one interlace and the set of RB-sets (including the intra-cell guard bands), wherein one copy is mapped to the RBs in the intersection of the one interlace and each RB-set. In one sub-instance, RBs in the intersection of one interlace and the intra-cell guard band will be used for mapping of S-SS/PSBCH block, if the number of RBs in the intersection of the one interlace, and the RB-set is smaller than 11 RBs. In one sub-instance, RBs in the intersection of one interlace and the intra-cell guard band will also be used for mapping of S-SS/PSBCH block.

In yet another example, a UE can be provided with one interlace index to transmit or receive the S-SS/PSBCH block.

For one instance, the UE 116 doesn't expect the number of RBs in the interlace to be smaller than 11 (e.g., 10).

For another instance, if the number of RBs in the interlace is smaller than 11, the S-SS/PSBCH block can be truncated by 12 REs and mapped to the RBs in the interlace.

In yet another example, a UE can be provided with one or multiple interlace indexes to transmit or receive the S-SS/PSBCH block.

For one instance, the UE 116 maps the 11 RBs of the S-SS/PSBCH block into the RBs in the one or multiple interlace, first in an order of lower to higher RBs in each interlace, and then in an order of lowest interlace to higher interlace in the set of interlaces.

For another instance, the UE 116 maps copies of the 11 RBs of the S-SS/PSBCH block into the RBs in the one or multiple interlace, first in an order of lower to higher RBs in each interlace, and then in an order of lowest interlace to higher interlace in the set of interlaces, until all the RBs in the one or multiple interlace are filled by the RBs of the S-SS/PSBCH block (may or may not use an integer number of 11 RBs).

Figure 14:
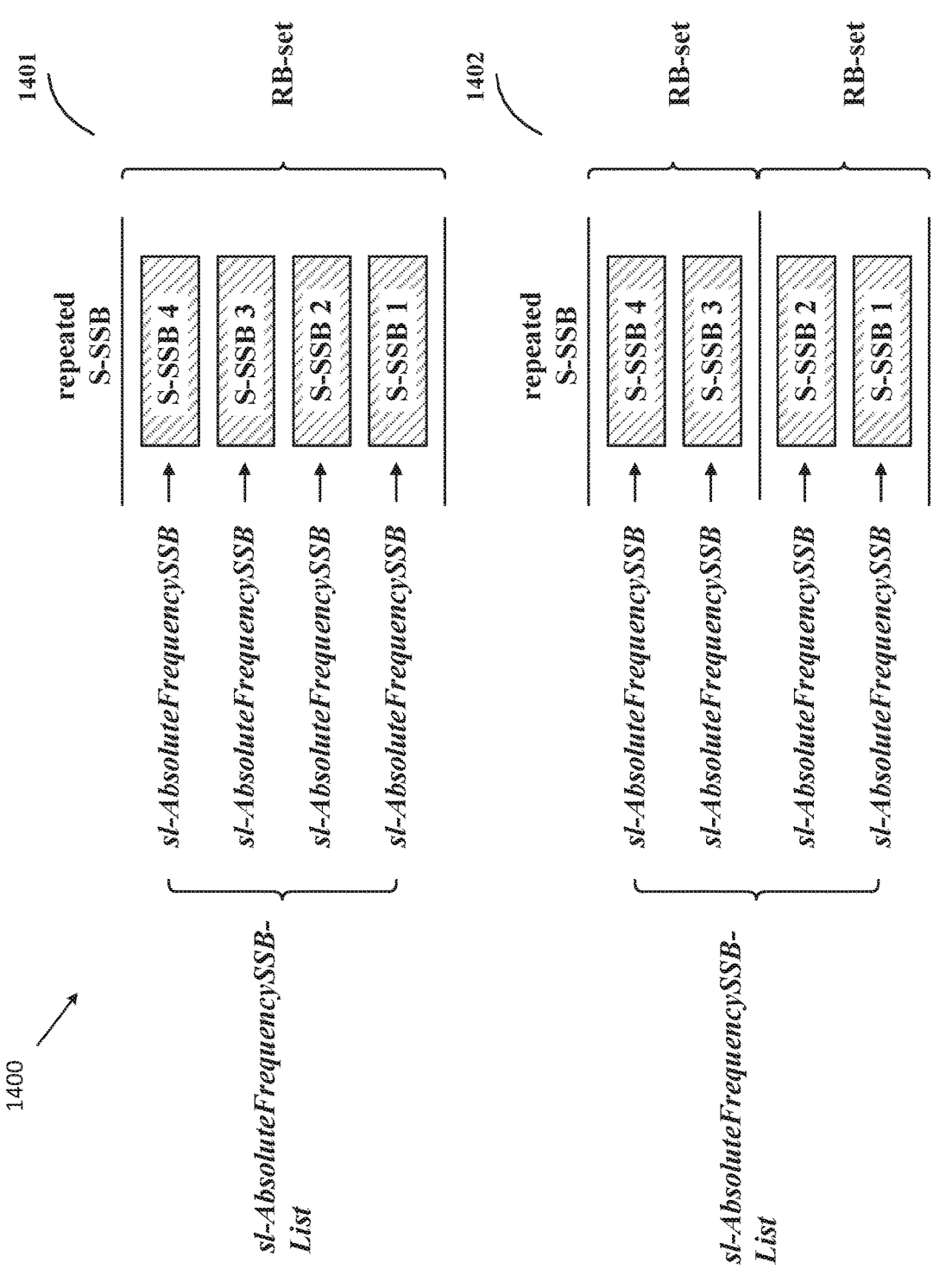
FIG. 14 illustrates an example of a repeated SL synchronization signals-block (S-SSB) transmission according to embodiments of the present disclosure.

FIG. 14 illustrates an example architecture 1400 for a repeated S-SSB transmission according to embodiments of the present disclosure. For example, architecture 1400 may be utilized by any of the UEs 111-116 to perform SL communications. This example is for illustration only and other embodiments can be used without departing from the scope of the present disclosure.

In one example, S-SS/PSBCH block (S-SSB) can be repeated in the frequency domain, within one RB-set (as illustrated in 1401 of FIG. 14) and/or across multiple RB-sets (as illustrated in 1402 of FIG. 14).

In one instance of the example, the frequency locations for the set of (repeated)S-SS/PSBCH blocks can be provided by a (pre-)configuration (e.g., sl-AbsoluteFrequencySSB-List), wherein the (pre-)configuration can include a number of frequency locations (e.g., sl-AbsoluteFrequencySSB) and each of the frequency location is associated with one S-SS/PSBCH block (e.g., indicating the location of subcarrier #66 in the S-SS/PSBCH block).

In another instance of the example, when the (pre-)configuration (e.g., sl-AbsoluteFrequencySSB-List) has a single entry, it implies the legacy S-SS/PSBCH block without repetition.

In yet another instance of the example, the entries in the (pre-)configuration (e.g., sl-AbsoluteFrequencySSB-List) can be divided into K groups, wherein K is the number of RB-sets for the S-SS/PSBCH transmission, and each group is associated with one RB-set. In one sub-instance, each group only has one entry (e.g., each entry corresponds to one RB-set). For another sub-instance, the number of entries in a group can be 2. For yet another sub-instance, the number of entries in a group can be configurable, e.g., from 1 to N, and there can be an upper bound on the number of entries in a group, e.g., N as 4 for SCS of 30 kHz, or N as 8 for SCS of 15 kHz.

In yet another instance of the example, the S-SS/PSBCH block transmission corresponding to all the entries in a group within the (pre-)configuration (e.g., sl-AbsoluteFrequencySSB-List) can satisfy the OCB requirement of the corresponding channel including the RB-set.

In yet another instance of the example, the repeated S-SS/PSBCH blocks within a RB-set and/or across RB-sets (e.g., provided by the (pre-)configuration (e.g., sl-AbsoluteFrequencySSB-List)) share the same for at least one of the following: a same transmission power; a same time domain transmission pattern; a same synchronization ID; a same S-SS/PSBCH block index in the same S-SS/PSBCH block transmission instance; a same sequence and mapping for S-PSS; a same sequence and mapping for S-SSS; a same coded bits and rate matching for PSBCH; and a same sequence and mapping for DM-RS of PBCH.

In yet another instance of the example, the set of (repeated)S-SS/PSBCH blocks can be provided a (pre-)configuration for the transmission power, wherein the (pre-)configuration includes a set of transmission power values, and each transmission power value is associated with a S-SS/PSBCH block transmission within the set of (repeated) S-SS/PSBCH blocks.

In yet another instance of the example, the UE 116 transmits the repeated S-SS/PSBCH blocks on the RB-sets where the channel access procedures are successful.

In yet another instance of the example, the UE 116 can be provided with a (pre-)configuration including information on S-SS/PSBCH block(s) within one RB-set, and then the UE 116 transmits S-SS/PSBCH blocks on the one RB-set where the channel access procedure is successful. For this instance, the UE 116 can transmit S-SS/PSBCH block(s) within other RB-set(s) where a channel access procedure is successful (e.g., the RB-set is included in the channel where the channel access procedure is successful).

In yet another instance of the example, the UE 116 can transmit the repeated S-SS/PSBCH blocks or a subset of the repeated S-SS/PSBCH blocks on a set of the RB-sets where the channel access procedures are successful (e.g., the RB-sets are included in the channels where the channel access procedures are successful).

For a sidelink operated over an unlicensed spectrum, wideband operation also needs to be supported, and the associated multi-channel access procedure should be supported.

Embodiments of the present disclosure also provide on multi-channel access procedures for sidelink unlicensed, wherein the carrier with a wideband span multiple of LBT bandwidths (e.g., 20 MHz). More precisely, the following aspects are included in the present disclosure: Dynamic mode sidelink multi-channel access procedure including both type A sidelink multi-channel access procedure and type B sidelink multi-channel access procedure; Semi-static mode sidelink multi-channel access procedure; and an example UE procedure.

In one embodiment, a multi-channel access procedure can be supported for dynamic mode sidelink operation with shared spectrum channel access.

In one example, at least one of a first type (e.g., Type A) or a second type (e.g., Type B) multi-channel access procedure can be supported for dynamic mode sidelink operation with shared spectrum channel access. For one instance, there can be an indication to the UE 116 whether the first type and/or the second type sidelink multi-channel access procedure can be supported, e.g., configured by a higher layer parameter and/or provided by a pre-configuration. For another instance, whether it's the first type and/or the second type sidelink, multi-channel access procedure can be supported, can be one or more UE capabilities, and reported to the gNB 102.

Figure 15:
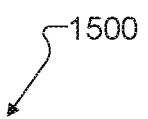
FIG. 15 illustrates an example of dynamic mode Type A SL multi-channel access procedure according to embodiments of the present disclosure.
Figure 15:
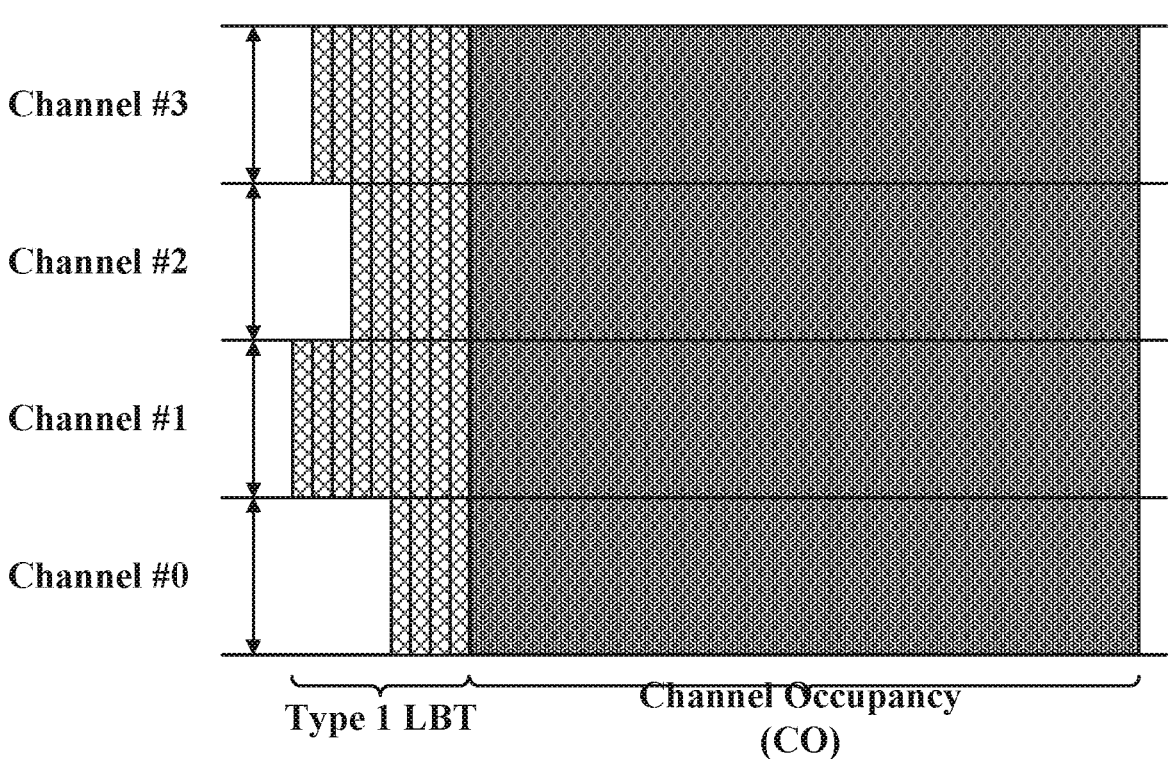

FIG. 15 illustrates an example architecture 1500 for dynamic mode Type A SL multi-channel access procedure according to embodiments of the present disclosure. For example, UE 116 can utilize architecture 1500 to perform SL communications. This example is for illustration only and other embodiments can be used without departing from the scope of the present disclosure.

In one embodiment of Type A sidelink multi-channel access procedure, a first type of multi-channel access procedure can be supported for dynamic mode sidelink operation with shared spectrum channel access (e.g., dynamic mode Type A SL multi-channel access procedure).

For one example, in the dynamic mode Type A SL multi-channel access procedure, if a UE intends to transmit on a set of channels C (e.g., with scheduled or configured or selected resource for sidelink transmissions including PSSCH/PSCCH transmission, and/or S-SSB transmission, and/or PSFCH transmission), the UE 116 can perform a dynamic mode sidelink single-channel access procedure on each channel $c_i$ within the set of channels (e.g., $c_i \in C$), wherein $0 \le i \le I-1$, and I is a number of channels in C.

For another example, the dynamic mode Type A sidelink single-channel access procedure 1500 can be Type 1 sidelink channel access procedure (or Type 1 LBT), wherein the time duration spanned by the sensing slots that are sensed to be idle before the transmission is random, and the number of sensing slots is determined based on a counter $N_i$ for channel ct.

For one instance, the counter $N_i$ for channel $c_i$ can be independently generated by the UE 116.

For another instance, the counter $N_i$ for channel $c_i$ can be independently generated by the gNB 102 and indicated to the UE 116 (e.g., for case the UE 116 in the coverage of the gNB 102).

For yet another instance, the counter $N_i$ for channel $c_i$ can be common for all the channels in C, and generated by the UE 116. For one instance, the common counter $N_i$ for all the channels can be generated based on the maximum contention window size among all the channels.

For yet another instance, the counter $N_i$ for channel $c_i$ can be common for all the channels in C, generated by the gNB 102, and indicated to the UE 116 (e.g., for case the UE 116 in the coverage of the gNB 102).

For yet another example, in the Type 1 sidelink channel access procedure (or Type 1 LBT), the counter $N_i$ for channel $c_i$ can be generated based on a contention window size $CW_i$.

For one instance, the contention window size $CW_i$ for channel $c_i$ can be independently adjusted by the UE 116. For this instance, any sidelink transmission that overlaps with channel $c_i$ can contribute to the adjustment of the contention window size $CW_i$ for channel $c_i$.

For another instance, the contention window size $CW_i$ for channel $c_i$ can be independently adjusted by the gNB 102 and indicated to the UE 116 (e.g., for case the UE 116 in the coverage of the gNB 102). For this instance, any sidelink transmission that overlaps with channel $c_i$ can contribute to the adjustment of the contention window size $CW_i$ for channel $c_i$.

For yet another instance, the contention window size $CW_i$ for channel $c_i$ can be common for all the channels in C, and adjusted by the UE 116. For this instance, any sidelink transmission that overlaps with channel $c_i$ can contribute to the adjustment of the contention window size $CW_i$ for channel $c_i$.

For yet another instance, the contention window size $CW_i$ for channel $c_i$ can be common for all the channels in C, adjusted by the gNB 102, and indicated to the UE 116 (e.g., for case the UE 116 in the coverage of the gNB 102). For this instance, any sidelink transmission that overlaps with channel $c_i$ can contribute to the adjustment of the contention window size $CW_i$ for channel $c_i$.

For yet another example, the dynamic mode sidelink single-channel access procedure can be Type 2 sidelink channel access procedure (or Type 2 LBT), wherein the time duration spanned by the sensing slots that are sensed to be idle before the transmission is deterministic (e.g., 25 us). For one instance, the Type 2 sidelink channel access procedure can be used for sidelink discovery burst only, with a potential condition on the duty cycle and/or transmission duration.

For yet another example, the UE 116 may transmit on the channels where the corresponding sidelink single-channel access procedure is performed successfully (e.g., channel sensed to be idle). Denote this transmission behavior after multi-channel access procedure as Type 1 transmission behavior. For one instance, the channels that the UE 116 may transmit could be contiguous in the frequency domain (e.g., the indexes of the channels are contiguous). For another instance, this can be applied when the wideband carrier is provided with intra-cell guard band configuration (e.g., configured by a higher layer parameter and/or provided by a pre-configuration). For yet another instance, this can be applied when the SL transmission(s) are not using the RBs in the intra-cell guard band(s). For a first sub-instance, the SL transmission(s) can be S-SS/PSBCH block transmission(s); for a second sub-instance, the SL transmission(s) can be PSFCH transmission(s) (e.g., wherein the PSFCH transmission(s) are not using the RBs in the intra-cell guard band(s)); for a third sub-instance, the SL transmission(s) can be PSSCH/PSCCH transmission(s), wherein the PSSCH/PSCCH transmission(s) are not using the RBs in the intra-cell guard band(s); for a forth sub-instance, the SL transmission(s) can be a combination of sub-instances described herein.

For yet another example, the UE 116 may transmit on all channels when the corresponding sidelink single-channel access procedure is performed successfully (e.g., channel sensed to be idle); and the UE 116 may not transmit on any of the channels when at least one corresponding sidelink single-channel access procedure is performed not successfully (e.g., channel sensed to be busy). Denote this transmission behavior after multi-channel access procedure as Type 2 transmission behavior. For one instance, this can be applicable when the wideband carrier is not provided with intra-cell guard band configuration (e.g., configured by a higher layer parameter and/or provided by a pre-configuration).

For yet another example, both Type 1 and Type 2 transmission behavior can be supported. In one instance, whether Type 1 or Type 2 transmission behavior is supported can be subject to a UE capability. In another instance, whether Type 1 transmission behavior is supported can be subject to a UE capability. In another instance, whether Type 1 or Type 2 transmission behavior is supported can be based on a configuration by a higher layer parameter and/or a pre-configuration. In yet another instance, whether Type 1 transmission behavior is supported can be subject to a configuration by higher layer parameters and/or a pre-configuration. In yet another instance, Type 1 transmission behavior is applicable, if other RAT sharing the channel(s) can be guaranteed to be absent (e.g., in regulation level).

For yet another example, the transmission on the channels (all or a subset according to examples of this disclosure) can start at the same time instance.

For yet another example, the UE 116 can reinitialize the counters $N_i$ for all the channels, when the UE 116 ceases transmission on any of the channels.

For yet another example, the UE 116 can reinitialize the counters $N_i$ for the channels $i \ne j$, when the UE 116 ceases transmission on the channel j.

For yet another example, the UE 116 can resume decrementing the counters $N_i$ for the channels $i \ne j$ after sensing the channel to be idle for a time duration, when the UE 116 ceases transmission on the channel j. For one instance, the time duration can be $4 \cdot T_{sl}$. For another instance, this is applicable when other technology sharing the channel cannot be guaranteed on a long term basis (e.g., by level of regulation).

For yet another example, the channel frequencies for the set of channels C can be a subset of the set of channel frequencies supported for sidelink unlicensed operation.

For yet another example, the UE 116 can transmit on the channel $c_i$ for a period not exceeding a duration given by $T_{mcot,i}$, wherein $T_{mcot,i}$ is determined based on the corresponding sidelink single-channel access procedure performed on channel $c_i$.

Figure 16:
FIG. 16 illustrates an example of dynamic mode Type B SL multi-channel access procedure according to embodiments of the present disclosure.
Figure 16:
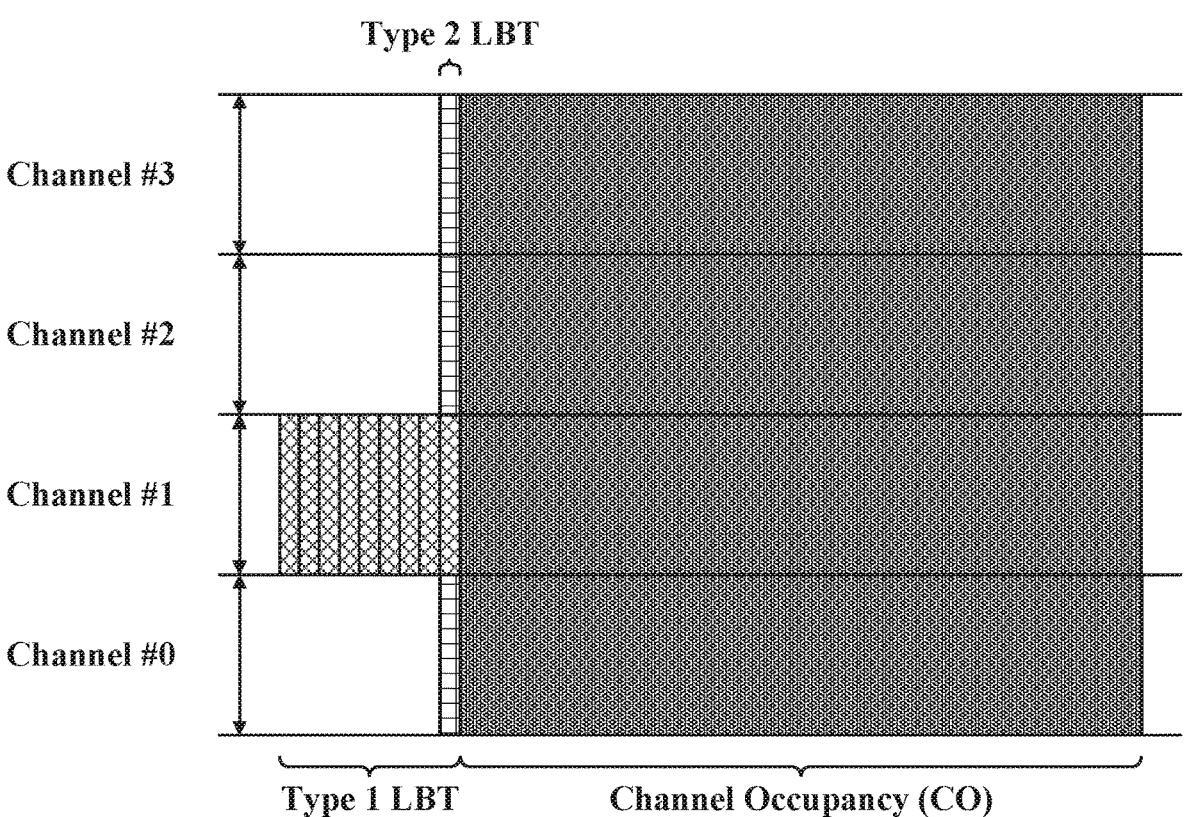

FIG. 16 illustrates an example architecture 1600 for dynamic mode Type B SL multi-channel access procedure according to embodiments of the present disclosure. For example, UE 111 may utilize the architecture 1600 to perform receptions or transmissions on the allocated sidelink channels to UEs 111A-111C. This example is for illustration only and other embodiments can be used without departing from the scope of the present disclosure.

In one embodiment of the Type B SL multi-channel access procedure, a second type of multi-channel access procedure can be supported for dynamic mode sidelink operation with shared spectrum channel access (e.g., dynamic mode Type B SL multi-channel access procedure).

For one example, in the dynamic mode Type B SL multi-channel access procedure 1600, if a UE intends to transmit on a set of channels C (e.g., with scheduled or configured or selected resource for sidelink transmissions, including PSSCH/PSCCH transmission, and/or S-SSB transmission, and/or PSFCH transmission), the UE 116 can perform a first dynamic mode sidelink single-channel access procedure on a channel $c_i$ within (e.g., $c_i \in C$), wherein $0 \leq i \leq I-1$, and I is a number of channels in C, and perform a set of second dynamic mode sidelink single-channel access procedures, wherein each second dynamic mode sidelink single-channel access procedure is performed on a channel $c_1$ within the set of channels with j #i.

For another example, the first dynamic mode sidelink single-channel access procedure can be Type 1 sidelink channel access procedure (or Type 1 LBT), wherein the time duration spanned by the sensing slots that are sensed to be idle before the transmission is random, and the number of sensing slots is determined based on a counter $N_i$ for channel $c_i$.

For one instance, the counter $N_i$ for channel $c_i$ can be generated by the UE 116. For another instance, the counter $N_i$ for channel $c_i$ can be generated by the gNB 102 and indicated to the UE 116 (e.g., for case the UE 116 in the coverage of the gNB 102).

For yet another example, in the Type 1 sidelink channel access procedure (or Type 1 LBT), the counter $N_i$ for channel $c_i$ can be generated based on a contention window size $CW_i$.

For one instance, the contention window size $CW_i$ for channel $c_i$ can be maintained independently for each channel $c_i$, and adjusted by the UE 116. For this instance, any sidelink transmission that overlaps with channel $c_i$ can contribute to the adjustment of the contention window size $CW_i$ for channel $c_i$. In one further consideration, when the counter $N_i$ is generated for channel $c_i$, the UE 116 can choose the largest value of $CW_i$ among all the channels in the set C.

For another instance, the contention window size $CW_i$ can be common for all channels in the set C, and adjusted by the UE 116. For this instance, any sidelink transmission that overlaps with any channel in the set C can contribute to the adjustment of the contention window size $CW_i$.

For yet another instance, the contention window size $CW_i$ for channel $c_i$ can be maintained independently for each channel $c_i$, and adjusted by the gNB 102 and indicated to the UE 116 (e.g., for case the UE 116 in the coverage of the gNB 102). For this instance, any sidelink transmission that overlaps with channel $c_i$ can contribute to the adjustment of the contention window size $CW_i$ for channel ct. In one further consideration, when the counter $N_i$ is generated for channel $c_i$, the gNB 102 can choose the largest value of $CW_i$ among all the channels in the set C.

For yet another instance, the contention window size $CW_i$ can be common for all channels in the set C, adjusted by the gNB 102, and indicated to the UE 116 (e.g., for case the UE 116 in the coverage of the gNB 102). For this instance, any sidelink transmission that overlaps with any channel in the set C can contribute to the adjustment of the contention window size $CW_i$.

For yet another example, the first dynamic mode sidelink single-channel access procedure can be Type 2 sidelink channel access procedure (or Type 2 LBT), wherein the time duration spanned by the sensing slots that are sensed to be idle before the transmission is deterministic (e.g., 25 us). For one instance, the Type 2 sidelink channel access procedure can be used for sidelink discovery burst only, with a potential condition on the duty cycle and/or transmission duration.

For yet another example, the second dynamic mode sidelink single-channel access procedure can be Type 2 sidelink channel access procedure (or Type 2 LBT), wherein the time duration spanned by the sensing slots that are sensed to be idle before the transmission is deterministic (e.g., 25 us). For one instance, the Type 2 sidelink channel access procedure (or Type 2 LBT) can be performed immediately before the transmission on channel $c_j$.

For yet another example, the second dynamic mode sidelink single-channel access procedure can be performed only when the first dynamic mode sidelink single-channel access procedure succeeds.

For yet another example, the second dynamic mode sidelink single-channel access procedure can be performed regardless of whether the first dynamic mode sidelink single-channel access procedure succeeds or not.

For yet another example, the UE 116 may transmit on the channel $c_i$, if the first dynamic mode sidelink single-channel access procedure is performed successfully on channel $c_i$ (e.g., channel sensed to be idle), and the UE 116 may transmit on the channel $c_1$ ($j \neq i$), if the first dynamic mode sidelink single-channel access procedure is performed successfully on channel $c_i$ (e.g., channel sensed to be idle), and the second dynamic mode sidelink single-channel access procedure is performed successfully on channel $c_j$ (e.g., channel sensed to be idle). Denote this transmission behavior after multi-channel access procedure as Type 1 transmission behavior. For one instance, there could be a further requirement that the set of channels (e.g., channel i and all possible channel j) that the UE 116 may transmit on is contiguous in the frequency domain (e.g., the indexes of the channels are contiguous). For another instance, this can be applied when the wideband carrier is provided with intra-cell guard band configuration (e.g., configured by a higher layer parameter and/or provided by a pre-configuration). For yet another instance, this can be applied when the SL transmission(s) are not using the RBs in the intra-cell guard band(s). For a first sub-instance, the SL transmission(s) can be S-SS/PSBCH block transmission(s); for a second sub-instance, the SL transmission(s) can be PSFCH transmission(s) (e.g., wherein the PSFCH transmission(s) are not using the RBs in the intra-cell guard band(s)); for a third sub-instance, the SL transmission(s) can be PSSCH/PSCCH transmission(s), wherein the PSSCH/PSCCH transmission(s) are not using the RBs in the intra-cell guard band(s); for a forth sub-instance, the SL transmission(s) can be a combination of sub-instances described herein.

For yet another example, the UE 116 may transmit on the channel $c_i$, if the first dynamic mode sidelink single-channel access procedure is performed successfully on channel $c_i$ (e.g., channel sensed to be idle), and the UE 116 may transmit on the channel $c_j$ (j≠i), if the first dynamic mode sidelink single-channel access procedure is performed successfully on channel $c_i$ (e.g., channel sensed to be idle), and the second dynamic mode sidelink single-channel access procedure is performed successfully on channel $c_j$(e.g., channel sensed to be idle); the UE 116 may not transmit on any of the channels when the first or any of the second dynamic sidelink single-channel access procedures are not performed successfully (e.g., channel sensed to be busy). Denote this transmission behavior after multi-channel access procedure as Type 2 transmission behavior. For one instance, this can be applied when the wideband carrier is not provided with intra-cell guard band configuration (e.g., configured by a higher layer parameter and/or provided by a pre-configuration).

For yet another example, both Type 1 and Type 2 transmission behavior can be supported. In one instance, whether Type 1 or Type 2 transmission behavior is supported can be subject to a UE capability. In another instance, whether Type 1 transmission behavior is supported can be subject to a UE capability. In another instance, whether Type 1 or Type 2 transmission behavior is supported can be based on a configuration by a higher layer parameter and/or a pre-configuration. In yet another instance, whether Type 1 transmission behavior is supported can be subject to a configuration by higher layer parameters and/or a pre-configuration. In yet another instance, Type 1 transmission behavior is applicable, if other RAT sharing the channel(s) can be guaranteed to be absent (e.g., in regulation level).

For yet another example, the transmission on the channels (all or a subset according to examples of this disclosure) can start at the same time instance.

For yet another example, the UE 116 can reinitialize the counter $N_i$ for the channel $c_i$, when the UE 116 ceases transmission on the channel $c_i$.

For yet another example, the channel frequencies for the set of channels C can be a subset of the set of channel frequencies supported for sidelink unlicensed operation.

For yet another example, the UE 116 can transmit on the channel $c_j$(j #i) for a period not exceeding a duration given by $T_{mcot,j}$, wherein $T_{mcot,j}$ is determined based on the corresponding sidelink single-channel access procedure performed on channel $c_i$.

For yet another example, the channel $c_i$ can be selected by the UE 116 uniformly and randomly from the set of channels C. For one instance, the selection of the channel $c_i$ may not be more frequent than a predefined threshold, e.g., once every 1 second.

For yet another example, the channel $c_i$ can be indicated by the gNB 102, e.g., configured by a higher layer parameter and/or provided by a pre-configuration. For one instance, the indication of the channel $c_i$ may not be more frequent than a predefined threshold, e.g., once every 1 second.

In one embodiment, a multi-channel access procedure can be supported for semi-static mode sidelink operation with shared spectrum channel access.

Figure 17:
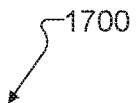
FIG. 17 illustrates an example of semi-static mode SL multi-channel access procedure according to embodiments of the present disclosure.
Figure 17:
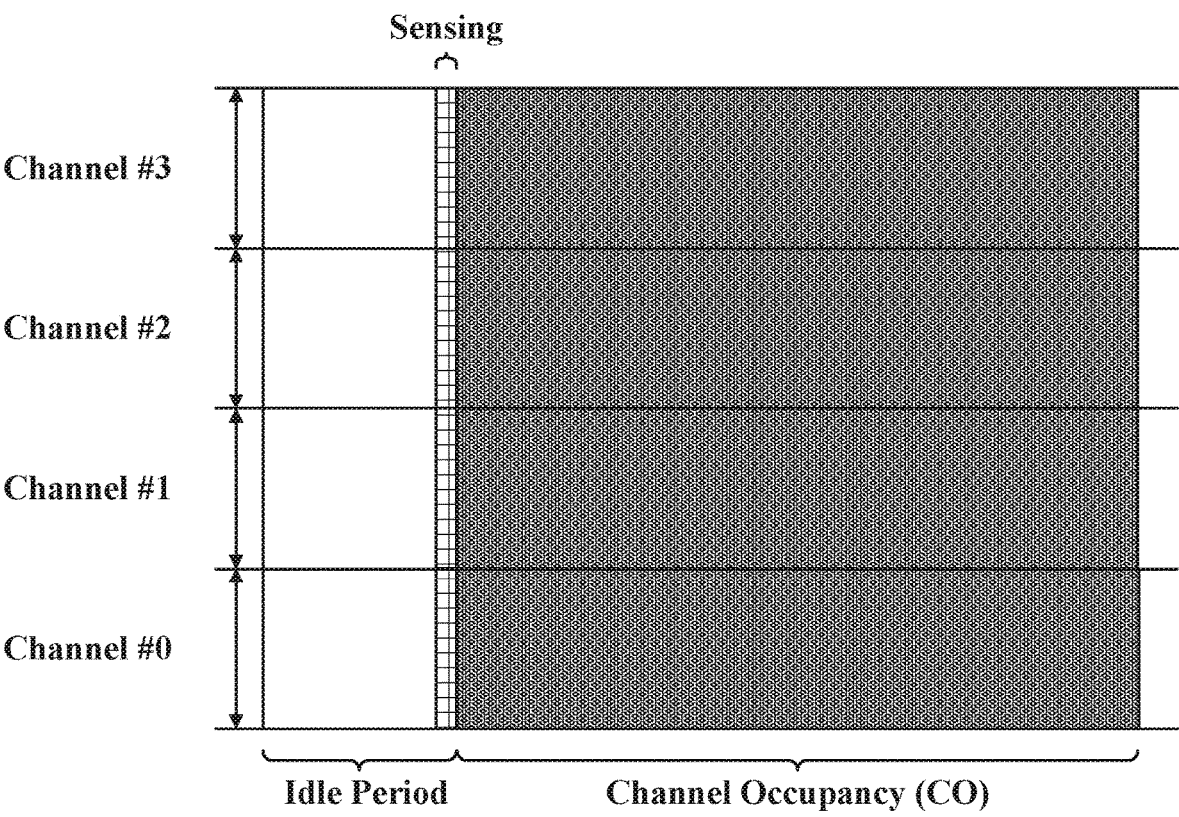

FIG. 17 illustrates an example architecture 1700 for semi-static mode SL multi-channel access procedure according to embodiments of the present disclosure. For example, architecture 1700 may be utilized by any of the UEs 111-116 to perform SL communications. This example is for illustration only and other embodiments can be used without departing from the scope of the present disclosure.

In one example, at least one of a semi-static or a dynamic mode channel access procedure can be supported for sidelink operation with shared spectrum channel access. For one instance, there can be an indication to the UE 116 whether the semi-static and/or the dynamic mode sidelink channel access procedure can be supported, e.g., configured by a higher layer parameter and/or provided by a pre-configuration. For another instance, whether the semi-static and/or the dynamic mode sidelink channel access procedure can be supported can be one or more UE capabilities and reported to the gNB 102.

For one example, in the semi-static mode SL multi-channel access procedure 1700, if a UE intends to transmit on a set of channels C (e.g., with scheduled or configured sidelink transmissions), the UE 116 can perform a semi-static mode sidelink single-channel access procedure on each channel $c_i$ within the set of channels (e.g., $c_i \in C$), wherein $0 \le i \le I-1$, and I is a number of channels in C.

For another example, the semi-static mode sidelink single-channel access procedure on each channel $c_i$ can be a sensing duration with a deterministic value performed immediately before the beginning of the channel occupancy time (e.g., located at the end of the idle period for semi-static mode channel access), wherein for instance, the deterministic value can be $T_{sl}$.

For yet another example, the semi-static mode sidelink single-channel access procedure on each channel $c_i$ can be a sensing duration with a deterministic value performed immediately before a transmission within the channel occupancy time, wherein, for instance, the deterministic value can be $T_{sl}$, if the gap between the transmission and the previous transmission is more than a predefined threshold, e.g., 16 us.

For yet another example, the semi-static mode sidelink single-channel access procedure on each channel $c_i$ can be no sensing performed immediately before a transmission within the channel occupancy time, if the gap between the transmission and the previous transmission is not more than a predefined threshold, e.g., 16 us.

For yet another example, the UE 116 may transmit on the channels where the corresponding sidelink single-channel access procedure is performed successfully (e.g., channel sensed to be idle). Denote this transmission behavior after multi-channel access procedure as Type 1 transmission behavior. For one instance, the channels that the UE 116 may transmit could be contiguous in the frequency domain (e.g., the indexes of the channels are contiguous). For another instance, this can be applied when the wideband carrier is provided with intra-cell guard band configuration (e.g., configured by a higher layer parameter and/or provided by a pre-configuration). For yet another instance, this can be applied when the SL transmission(s) are not using the RBs in the intra-cell guard band(s). For a first sub-instance, the SL transmission(s) can be S-SS/PSBCH block transmission(s); for a second sub-instance, the SL transmission(s) can be PSFCH transmission(s) (e.g., wherein the PSFCH transmission(s) are not using the RBs in the intra-cell guard band(s)); for a third sub-instance, the SL transmission(s) can be PSSCH/PSCCH transmission(s), wherein the PSSCH/PSCCH transmission(s) are not using the RBs in the intra-cell guard band(s); for a forth sub-instance, the SL transmission(s) can be a combination of sub-instances described herein.

For yet another example, the UE 116 may transmit on all channels when the corresponding sidelink single-channel access procedure is performed successfully (e.g., channel sensed to be idle); and the UE 116 may not transmit on any of the channels when at least one corresponding sidelink single-channel access procedure is performed not successfully (e.g., channel sensed to be busy). Denote this transmission behavior after multi-channel access procedure as Type 2 transmission behavior. For one instance, this can be applied when the wideband carrier is not provided with intra-cell guard band configuration (e.g., configured by a higher layer parameter and/or provided by a pre-configuration).

For yet another example, both Type 1 and Type 2 transmission behavior can be supported. In one instance, whether Type 1 or Type 2 transmission behavior is supported can be subject to a UE capability. In another instance, whether Type 1 transmission behavior is supported can be subject to a UE capability. In another instance, whether Type 1 or Type 2 transmission behavior is supported can be based on a configuration by a higher layer parameter and/or a pre-configuration. In yet another instance, whether Type 1 transmission behavior is supported can be subject to a configuration by higher layer parameters and/or a pre-configuration. In yet another instance, Type 1 transmission behavior is applicable, if other RAT sharing the channel(s) can be guaranteed to be absent (e.g., in regulation level).

For yet another example, the transmission on the channels (all or a subset according to examples of this disclosure) can start at the same time instance.

For yet another example, the channel frequencies for the set of channels C can be a subset of the set of channel frequencies supported for sidelink unlicensed operation.

For yet another example, the UE 116 assumes the channel occupancy starting location and/or duration of the channel occupancy on all the channels are the same.

Figure 18:
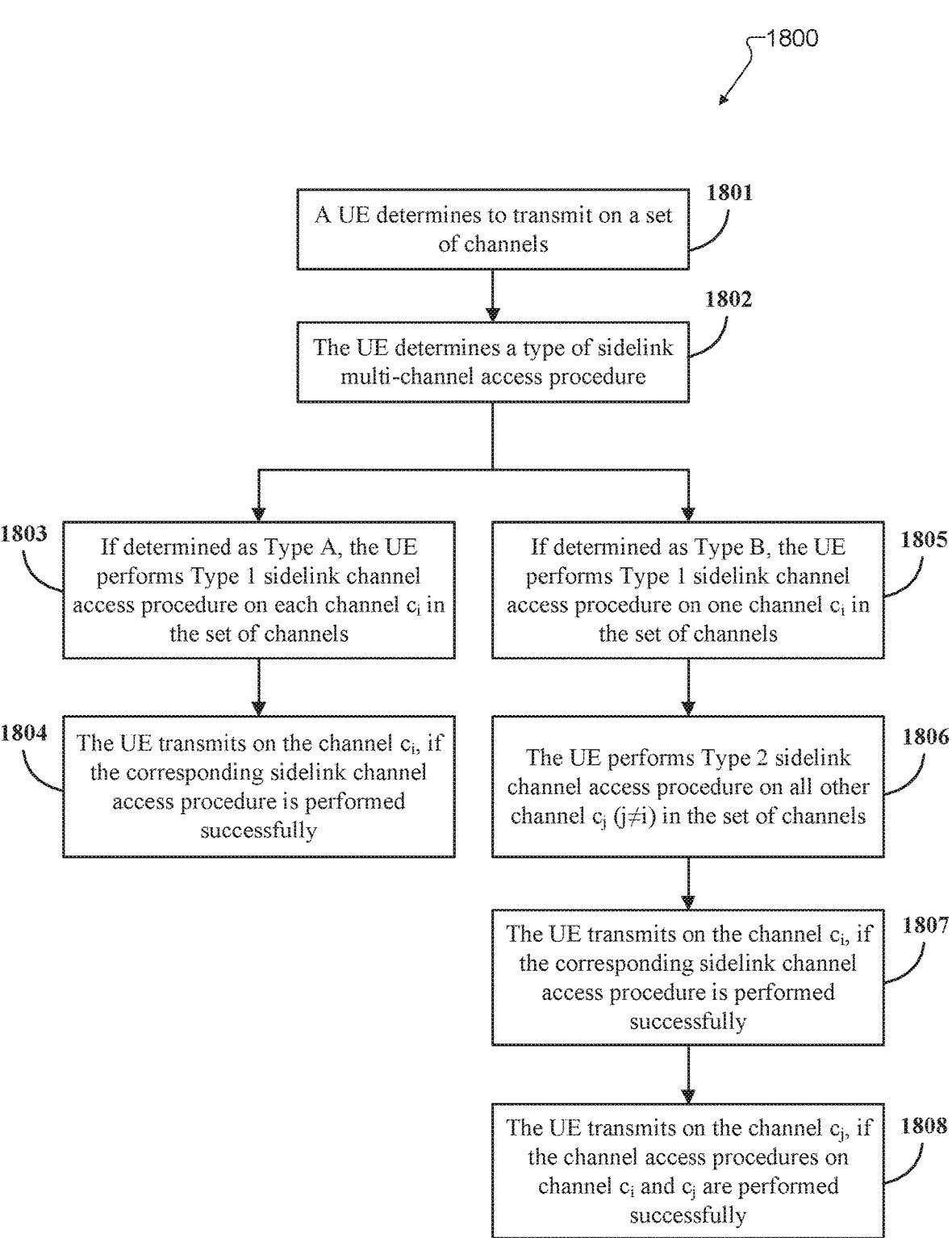
FIG. 18 illustrates a flowchart of an example UE procedure for SL multi-channel access procedure.

FIG. 18 illustrates an example of a flowchart of method 1800 for a UE procedure for SL multi-channel access procedure. For example, method 1800 can be performed by the UE 116 of FIG. 3. This example is for illustration only and other embodiments can be used without departing from the scope of the present disclosure.

In one embodiment, an example UE procedure for sidelink multi-channel access is shown in FIG. 18. In this example, a UE determines to transmit on a set of channels (1801), and the UE 111 determines a type of sidelink multi-channel access procedure (1802), according to example of this disclosure. If the determined sidelink multi-channel access procedure is a Type A sidelink multi-channel access procedure, the UE 111 performs Type 1 sidelink channel access procedure on each channel $c_i$ in the set of channels (1803) and transmits on the channel $c_i$ if the corresponding sidelink channel access procedure is performed successfully (1804). If the determined sidelink multi-channel access procedure is a Type B sidelink multi-channel access procedure, the UE 111 performs Type 1 sidelink channel access procedure on one channel $c_i$ in the set of channels (1805), and performs Type 2 sidelink channel access procedure on all the other channels $c_j$ (e.g., j≠i) in the set of channels (1806). The UE 111 transmits on the channel $c_i$ if the corresponding sidelink channel access procedure is performed successfully (1807), and the LIE 111 transmits on channel $c_j$ (e.g., j≠i), if the sidelink channel access procedures on channel $c_i$ and $c_j$ are performed successfully (1808).

In one embodiment, a LIE can report to a higher layer on failure of a channel access procedure.

In one example, the LIE 116 can report either single-channel access procedure or multi-channel access procedure is used when the channel access procedure is failed.

In another example, for dynamic multi-channel access procedure, the UE 116 can report which type (e.g., Type A and/or Type B) of dynamic multi-channel access procedure is performed when the multi-channel access procedure is failed.

In yet another example, for Type B dynamic multi-channel access procedure, the UE 116 can report which channel is used to perform the first dynamic mode sidelink single-channel access procedure (e.g., index of channel $c_i$) in Type B dynamic multi-channel access procedure is performed when the multi-channel access procedure is failed.

In yet another example, for single-channel access procedure, the UE 116 can skip reporting which type (e.g., Type A and/or Type B) of multi-channel access procedure is performed when the multi-channel access procedure is failed.

In yet another example, for multi-channel access procedure, the UE 116 can report which mode (e.g., dynamic mode and/or semi-static mode) of the channel access procedure is performed when the channel access procedure is failed.

In yet another example, for single-channel access procedure, the UE 116 can skip reporting which mode (e.g., dynamic mode and/or semi-static mode) of channel access procedure is performed when the channel access procedure is failed.

In yet another example, for multi-channel access procedure, the UE 116 can report which type (e.g., Type 1 and/or Type 2) of transmission behavior is used when the channel access procedure is failed.

In yet another example, for single-channel access procedure, the UE 116 can skip reporting which type (e.g., Type 1 and/or Type 2) of transmission behavior is used when the channel access procedure is failed.

In yet another example, for multi-channel access procedure, the UE 116 can report on which channel(s) (e.g., or which RB set(s) when the RB set(s) are provided) the channel access procedure fails.

For one sub-example, there can be a bitmap in the report, and each bit in the bitmap corresponds to a channel (or RB-set).

For one instance, a bit in the bitmap taking a value of 1 indicates the corresponding channel (or RB-set) has a failed channel access procedure.

For another instance, a bit in the bitmap taking a value of 0 indicates the corresponding channel (or RB-set) has a failed channel access procedure.

For one instance, the bitmap is with length L, wherein L is the number of channel(s) (or RB-set(s)) in the SL BWP.

For another instance, the bitmap is with length L, wherein L is the number of channel(s) (or RB-set(s)) in the SL resource pool.

For one instance, the bitmap can be applicable at least for Type A dynamic multi-channel access procedure.

For one instance, the bitmap can be applicable, at least for semi-static multi-channel access procedures.

For another sub-example, there can be a set of channel index(es) in the report.

In yet another example, for multi-channel access procedure, the UE 116 can report on which channel(s) (e.g., or which RB set(s) when the RB set(s) are provided) the channel access procedure succeeds.

For one sub-example, there can be a bitmap in the report, and each bit in the bitmap corresponds to a channel (or RB-set).

For one instance, a bit in the bitmap taking a value of 1 indicates the corresponding channel (or RB-set) has a successful channel access procedure.

For another instance, a bit in the bitmap taking a value of 0 indicates the corresponding channel (or RB-set) has a successful channel access procedure.

For one instance, the bitmap is with length L, wherein L is the number of channel(s) (or RB-set(s)) in the SL BWP.

For another instance, the bitmap is with length L, wherein L is the number of channel(s) (or RB-set(s)) in the SL resource pool.

For one instance, the bitmap can be applicable at least for Type A dynamic multi-channel access procedure.

For one instance, the bitmap can be applicable at least for semi-static multi-channel access procedures.

For another sub-example, there can be a set of channel index(es) in the report.

For one example, if Type 2 transmission behavior is supported, for Type A dynamic multi-channel access procedure, a UE can report all channel in the multi-channel access procedure as failures in the report.

For another example, if Type 2 transmission behavior is supported, for Type A dynamic multi-channel access procedure, a UE can report a set of channels in the multi-channel access procedure as failures in the report, wherein the set of channels has failed single-channel access procedure. For instance, although the UE 116 cannot transmit on any of the channels, according to Type 2 transmission behavior, the UE 116 may not need to report channel access failure on the channels wherein the single channel access procedure succeeds.

For one example, if Type 2 transmission behavior is supported, for Type B dynamic multi-channel access procedure, a UE can report all channel in the multi-channel access procedure as failures in the report.

For another example, if Type 2 transmission behavior is supported, for Type B dynamic multi-channel access procedure, a UE can report channel $c_i$ only as failure in the report (wherein a first dynamic mode sidelink single-channel access procedure is performed on channel $c_i$ and failed).

For another example, if Type 2 transmission behavior is supported, for Type B dynamic multi-channel access procedure, a UE can report a set of channels in the multi-channel access procedure as failures in the report, wherein the set of channels has failed single-channel access procedure. For instance, although the UE 116 cannot transmit on any of the channels, according to Type 2 transmission behavior, the UE 116 may not need to report channel access failure on the channels wherein the single channel access procedure succeeds.

For another example, if Type 2 transmission behavior is supported, for Type B dynamic multi-channel access procedure, if a first dynamic mode sidelink single-channel access procedure is performed on channel $c_i$ and failed, the UE 116 can report all channel in the multi-channel access procedure as failures in the report.

For another example, if Type 2 transmission behavior is supported, for Type B dynamic multi-channel access procedure, if a first dynamic mode sidelink single-channel access procedure is performed on channel $c_i$ and succeeds, the UE 116 can report a set of channels in the multi-channel access procedure as failures in the report, wherein the set of channels have failed single-channel access procedure. For instance, although the UE 116 cannot transmit on any of the channels, according to Type 2 transmission behavior, the UE 116 may not need to report channel access failure on the channels wherein the single channel access procedure succeeds.

For one example, if Type 2 transmission behavior is supported, for semi-static multi-channel access procedure, a UE can report all channel in the multi-channel access procedure as failures in the report.

For another example, if Type 2 transmission behavior is supported, for semi-static multi-channel access procedure, a UE can report a set of channels in the multi-channel access procedure as failures in the report, wherein the set of channels has failed single-channel access procedure. For instance, although the UE 116 cannot transmit on any of the channels, according to Type 2 transmission behavior, the UE 116 may not need to report channel access failure on the channels wherein the single channel access procedure succeeds.

For one example, if Type 1 transmission behavior is supported, for Type A dynamic multi-channel access procedure, a UE can report a set of channels in the multi-channel access procedure as failures in the report, wherein the set of channels has failed single-channel access procedure.

For another example, if Type 1 transmission behavior is supported, for Type B dynamic multi-channel access procedure, a UE can report channel $c_i$ only as failure in the report (wherein a first dynamic mode sidelink single-channel access procedure is performed on channel $c_i$ and failed).

For another example, if Type 1 transmission behavior is supported, for Type B dynamic multi-channel access procedure, a UE can report a set of channels in the multi-channel access procedure as failures in the report, wherein the set of channels has failed single-channel access procedure. For instance, although the UE 116 cannot transmit on any of the channels, according to Type 2 transmission behavior, the UE 116 may not need to report channel access failure on the channels wherein the single channel access procedure succeeds.

For another example, if Type 1 transmission behavior is supported, for Type B dynamic multi-channel access procedure, if a first dynamic mode sidelink single-channel access procedure is performed on channel $c_i$ and failed, the UE 116 can report all channels in the multi-channel access procedure as failures in the report.

For another example, if Type 1 transmission behavior is supported, for Type B dynamic multi-channel access procedure, if a first dynamic mode sidelink single-channel access procedure is performed on channel $c_i$ and succeeds, the UE 116 can report a set of channels in the multi-channel access procedure as failures in the report, wherein the set of channels have failed single-channel access procedure. For instance, although the UE 116 cannot transmit on any of the channels, according to Type 2 transmission behavior, the UE 116 may not need to report channel access failure on the channels wherein the single channel access procedure succeeds.

For yet another example, if Type 1 transmission behavior is supported, for semi-static multi-channel access procedure, a UE can report a set of channels in the multi-channel access procedure as failures in the report, wherein the set of channels has failed single-channel access procedure.

The above flowchart illustrates an example method that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
a transceiver; and
a processor operably coupled to the transceiver, the processor configured to:
determine a set of resource block sets (RB-sets) and a set of intra-cell guard bands between the set of RB-sets;
determine a sidelink (SL) bandwidth part (BWP);
determine a set of interlaces, wherein each interlace in the set of interlaces includes RBs with a uniform interval;
determine, based on the set of RB-sets, a resource pool, wherein a lowest RB of the resource pool is aligned with a lowest RB of a first RB set, and a highest RB of the resource pool is aligned with a highest RB of a second RB set;
determine, based on the resource pool, a set of sub-channels, wherein a sub-channel in the set of sub-channels includes RBs within one RB set and one interlace;
determine an index, $i_{sub\text{-}channel}^{RB\text{-}set}$, of the sub-channel by $i_{sub\text{-}channel}^{RB\text{-}set} = \text{floor}(i_{interlace}/N_{interlace}^{sub\text{-}channel})$, where $i_{interlace}$ is an interlace index with $0 \le i_{interlace} \le N_{interlace}-1$, and $N_{interlace}^{sub\text{-}channel}$ is a number of interlaces in the sub-channel, and where $N_{interlace}$ is a total number of interlaces, such that a first sub-channel with the index $i_{sub\text{-}channel}^{RB\text{-}set}=0$ corresponds to interlaces with the indexes $i_{interlace}=0, \ldots, N_{interlace}^{sub\text{-}channel}-1$, a second sub-channel with the index $i_{sub\text{-}channel}^{RB\text{-}set}=1$ corresponds to interlaces with the indexes $i_{interlace}=N_{interlace}^{sub\text{-}channel} \ldots, 2 \cdot N_{interlace}^{sub\text{-}channel}-1$, and until a last sub-channel with the index $i_{sub\text{-}channel}^{RB\text{-}set}=N_{interlace}/N_{interlace}^{sub\text{-}channel}-1$ corresponds to interlaces with the indexes $i_{interlace}=N_{interlace}-N_{interlace}^{sub\text{-}channel}, \ldots, N_{interlace}-1$;
determine, based on the set of sub-channels, to transmit a physical SL shared channel (PSSCH); and
perform a SL channel access procedure for transmitting the PSSCH; and
perform, via the transceiver, a PSSCH transmission after successfully performing the SL channel access procedure for transmitting the PSSCH.

2. The UE of claim 1, wherein:
a number of sub-channels in the set of sub-channels are used for the PSSCH transmission, and
the number of sub-channels are located in the set of RB-sets.

3. The UE of claim 1, wherein:
when the SL channel access procedure is successfully performed on at least two adjacent RB-sets, the at least two adjacent RB-sets and an intra-cell guard bands between the at least two adjacent RB-sets are used for the PSSCH transmission.

4. The UE of claim 1, wherein the processor is further configured to perform an SL channel access procedure for transmitting a synchronization signal block (SSB), or a physical sidelink feedback channel (PSFCH) as of a type A SL channel access procedure or a type B SL channel access procedure.

5. The UE of claim 4, wherein:
the type A SL channel access procedure includes a type 1 SL channel access procedure on each channel within a set of channels, and
the set of channels corresponds to the set of RB-sets including the sub-channels for the PSSCH transmission.

6. The UE of claim 5, wherein:
the type 1 SL channel access procedure includes a first time duration spanned by sensing slots that are sensed to be idle before the transmission, and
the first time duration is random.

7. The UE of claim 4, wherein:
the type B SL channel access procedure includes a type 1 SL channel access procedure on a first channel within a set of channels and a set of type 2 SL channel access procedures on remaining channels within the set of channels, and
the set of channels corresponds to the set of RB-sets including the sub-channels for the PSSCH transmission.

8. The UE of claim 7, wherein:
each type 2 channel access procedure in the set of type 2 SL channel access procedures includes a second time duration spanned by sensing slots that are sensed to be idle before the transmission, and
the second time duration is deterministic as 25 microseconds.

9. A method performed by a user equipment (UE) in a wireless communication system, the method comprising:
determining a set of resource block sets (RB-sets) and a set of intra-cell guard bands between the set of RB-sets;
determining a sidelink (SL) bandwidth part (BWP);
determining a set of interlaces, wherein each interlace in the set of interlaces includes RBs with uniform internal;
determining, based on the set of RB-sets, a resource pool, wherein a lowest RB of the resource pool is aligned with a lowest RB of a first RB set, and a highest RB of the resource pool is aligned with a highest RB of a second RB set;
determining, based on the resource pool, a set of sub-channels, wherein a sub-channel in the set of sub-channels includes RBs within one RB set and one interlace;
determine an index, $i_{sub\text{-}channel}^{RB\text{-}set}$, of the sub-channel by $i_{sub\text{-}channel}^{RB\text{-}set} = \text{floor}(i_{interlace}/N_{interlace}^{sub\text{-}channel})$, where $i_{interlace}$ is an interlace index with $0 \le i_{interlace} \le N_{interlace}-1$, and $N_{interlace}^{sub\text{-}channel}$ is a number of interlaces in the sub-channel, and where $N_{interlace}$ is a total number of interlaces, such that a first sub-channel with the index $i_{sub\text{-}channel}^{RB\text{-}set}=0$ corresponds to interlaces with the indexes $i_{interlace}=0, \ldots, N_{interlace}^{sub\text{-}channel}-1$, a second sub-channel with the index $i_{sub\text{-}channel}^{RB\text{-}set}=1$ corresponds to interlaces with the indexes $i_{interlace}=N_{interlace}^{sub\text{-}channel} \ldots, 2 \cdot N_{interlace}^{sub\text{-}channel}-1$, and until a last sub-channel with the index $i_{sub\text{-}channel}^{RB\text{-}set}=N_{interlace}/$ $N_{interlace}^{sub\text{-}channel}-1$ corresponds to interlaces with the indexes $i_{interlace}=N_{interlace}-N_{interlace}^{sub\text{-}channel}, \ldots, N_{interlace}-1$;

determining, based on the set of sub-channels, to transmit a physical SL shared channel (PSSCH);

performing a SL channel access procedure for transmitting the PSSCH; and performing a PSSCH transmission after successfully performing the SL channel access procedure for transmitting the PSSCH.

10. The method of claim 9, wherein:

a number of sub-channels in the set of sub-channels are used for the PSSCH transmission, and the number of sub-channels are located in the set of RB-sets.

11. The method of claim 9, wherein:

when the SL channel access procedure is successfully performed on at least two adjacent RB-sets, the at least two adjacent RB-sets and an intra-cell guard bands between the at least two adjacent RB-sets are used for the PSSCH transmission.

12. The method of claim 9, further comprising:

performing an SL channel access procedure for transmitting a synchronization signal block (SSB), or a physical sidelink feedback channel (PSFCH) as one of a type A SL channel access procedure or a type B SL channel access procedure.

13. The method of claim 12, wherein:

the type A SL channel access procedure includes a type 1 SL channel access procedure on each channel within a set of channels, and the set of channels corresponds to the set of RB-sets including the sub-channels for the PSSCH transmission.

14. The method of claim 13, wherein:

the type 1 SL channel access procedure includes a first time duration spanned by sensing slots that are sensed to be idle before the transmission, and the first time duration is random.

15. The method of claim 12, wherein:

the type B SL channel access procedure includes a type 1 SL channel access procedure on a first channel within a set of channels and a set of type 2 SL channel access procedures on remaining channels within the set of channels, and the set of channels corresponds to the set of RB-sets including the sub-channels for the PSSCH transmission.

16. The method of claim 15, wherein:

each type 2 SL channel access procedure in the set of type 2 SL channel access procedures includes a second time duration spanned by sensing slots that are sensed to be idle before the transmission, and the second time duration is deterministic as 25 microseconds.

* * * * *